(12) United States Patent
Mu et al.

(10) Patent No.: US 12,009,849 B2
(45) Date of Patent: Jun. 11, 2024

(54) DISTRIBUTED-ELEMENT FILTER FOR MMWAVE FREQUENCIES

(71) Applicant: Apple Inc., Cupertino, CA (US)

(72) Inventors: Xiaofang Mu, San Jose, CA (US); Bo Zhang, San Jose, CA (US); Mingjuan Zhu, Saratoga, CA (US); Chi V. Pham, San Jose, CA (US); Berke Cetinoneri, Palo Alto, CA (US); Timothy B. Ogilvie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 17/411,892

(22) Filed: Aug. 25, 2021

(65) Prior Publication Data

US 2023/0064458 A1   Mar. 2, 2023

(51) Int. Cl.
*H04B 1/04*      (2006.01)
*H04B 1/00*      (2006.01)
*H04B 1/52*      (2015.01)

(52) U.S. Cl.
CPC ......... *H04B 1/0483* (2013.01); *H04B 1/0057* (2013.01); *H04B 1/52* (2013.01); *H04B 2001/0408* (2013.01)

(58) Field of Classification Search
CPC ...... H04B 1/0483; H04B 1/0057; H04B 1/52; H04B 2001/0408
See application file for complete search history.

(56) References Cited

U.S. PATENT DOCUMENTS

| | | | | |
|---|---|---|---|---|
| 5,192,927 A | * | 3/1993 | Lin ....................... | H01P 1/2039 333/204 |
| 5,977,847 A | * | 11/1999 | Takahashi ............. | H01P 1/2039 333/204 |
| 6,191,666 B1 | * | 2/2001 | Sheen .................. | H03H 7/1758 333/204 |

(Continued)

OTHER PUBLICATIONS

Jia-Sheng Hong, M.J. Lancaster, Microstrip Filters for RF/Microwave Applications, ISBNs: 0-471-38877-7 (Hardback), 2001.

(Continued)

*Primary Examiner* — Jinsong Hu
*Assistant Examiner* — Rui M Hu
(74) *Attorney, Agent, or Firm* — FLETCHER YODER PC

(57) ABSTRACT

Frequency-filtering circuitry is disclosed that rejects power of a wireless signal having an undesired frequency while causing a decreased power loss to a wireless signal having a desired frequency using distributed elements, rather than lumped elements. The frequency-filtering circuitry may reject at least 5 decibels of power of a wireless signal having a frequency over 32 gigahertz, while causing a power loss of at most 1.1 decibels to a wireless signal having a frequency lower than 29.5 gigahertz. The frequency-filtering circuitry may include a main branch, a first parallel branch coupled and parallel to the main branch via a first connecting trace, and a second parallel branch coupled and parallel to the main branch via a second connecting trace. The first connecting trace intersects the main branch and the first parallel branch, and the second connecting trace intersects the main branch and the second parallel branch.

20 Claims, 15 Drawing Sheets

(56) References Cited

U.S. PATENT DOCUMENTS

| | | | |
|---|---|---|---|
| 7,034,631 B2 * | 4/2006 | Ono | H01P 1/2013 |
| | | | 333/33 |
| 9,166,264 B2 * | 10/2015 | Bao | H01P 1/2039 |
| 10,484,211 B2 | 11/2019 | Rogers | |
| 10,547,339 B2 | 1/2020 | Shiu | |
| 10,594,357 B2 | 3/2020 | Tombak | |
| 10,840,872 B2 | 11/2020 | Cheng | |
| 11,374,295 B2 * | 6/2022 | Kitabata | H01P 1/203 |
| 2006/0012421 A1 * | 1/2006 | Yamaguchi | H05K 1/0243 |
| | | | 327/552 |
| 2006/0082424 A1 * | 4/2006 | Chang | H01P 1/212 |
| | | | 333/204 |
| 2006/0170518 A1 * | 8/2006 | Chang | H03H 7/1783 |
| | | | 333/204 |
| 2010/0117766 A1 * | 5/2010 | Grondahl | H01P 1/20381 |
| | | | 333/204 |
| 2010/0277260 A1 * | 11/2010 | Haunberger | H01P 1/202 |
| | | | 333/206 |
| 2011/0068883 A1 * | 3/2011 | Li | H01P 1/20354 |
| | | | 333/205 |
| 2011/0250861 A1 * | 10/2011 | Lyons | H03D 7/1441 |
| | | | 455/326 |
| 2012/0194291 A1 * | 8/2012 | Pajovic | H01P 1/2005 |
| | | | 333/185 |
| 2013/0088309 A1 * | 4/2013 | Baik | H01P 1/20381 |
| | | | 333/204 |
| 2016/0013533 A1 * | 1/2016 | Chiang | H01P 7/08 |
| | | | 333/204 |
| 2017/0331167 A1 * | 11/2017 | Shaman | H01P 1/20381 |
| 2021/0126331 A1 * | 4/2021 | Kitabata | H01P 1/2039 |
| 2022/0115986 A1 * | 4/2022 | Shin | H03K 5/00006 |
| 2022/0123453 A1 * | 4/2022 | Ramzan | H01P 5/12 |
| 2022/0285812 A1 * | 9/2022 | Hasegawa | H01P 1/20381 |
| 2022/0418093 A1 * | 12/2022 | Kopp | H05K 1/0237 |

OTHER PUBLICATIONS

C.-J. Hwang, L.B. Lok, I.G. Thayne, Parallel coupled-line bandpass filter with branch-line shape for G-band frequency, Electronics Letters Jul. 30, 2009 vol. 45 No. 16.

* cited by examiner

DISTRIBUTED-ELEMENT FILTER FOR MMWAVE FREQUENCIES

BACKGROUND

The present disclosure relates generally to wireless communication and more specifically to filtering noise at undesired frequencies from a wireless signal.

In a mobile communication device, a transceiver may transmit and receive wireless signals. For example, the transceiver may enable communication over millimeter wave (mmWave) frequencies (e.g., 24.25 gigahertz (GHz) and above). However, spurious emissions in the mmWave frequencies, such as those at greater than 32 GHz caused by satellite and/or space communications, may cause interference with device communications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, frequency-filtering circuitry includes a main branch and a first branch coupled to the main branch via a first connecting trace. The first branch extends in a same direction as the main branch, and the first connecting trace is intersects the main branch and the first branch. The frequency-filtering circuitry also includes a second branch coupled to the main branch via a second connecting trace. The second branch extends in an opposite direction with respect to the main branch, and the second connecting trace intersects the main branch and the second branch.

In another embodiment, a transceiver includes an amplifier and a filter electrically coupled to the amplifier. The filter includes a series branch, a first parallel branch coupled to the series branch via a first connecting trace, and a second parallel branch coupled to the series branch via a second connecting trace. The first parallel branch and the second parallel branch are each parallel to the series branch. Additionally, a distance between the first parallel branch and the second parallel branch is within 122 micrometers.

In yet another embodiment, an electronic device includes a printed circuit board having at least a first layer, a second layer, and an intermediate layer disposed between the first layer and the second layer. The electronic device also includes one or more antennas, and a transceiver coupled to the one or more antennas. The transceiver includes filtering circuitry disposed on the intermediate layer. The filtering circuitry includes a series circuit trace, a first circuit trace coupled to the series circuit trace via a first connecting trace, and a second circuit trace coupled to the series circuit trace via a second connecting trace. The first circuit trace and the second circuit trace are each alongside the series circuit trace.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
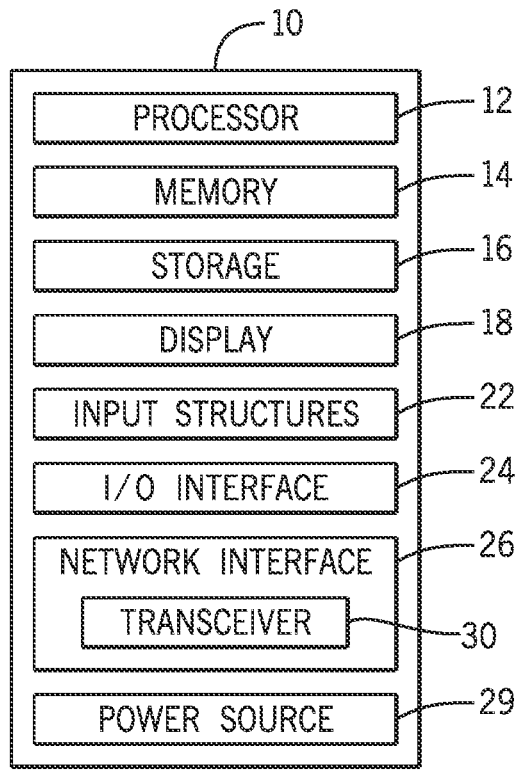
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to filtering noise at undesired frequencies from a wireless signal. In a mobile communication device, a transceiver may transmit and receive wireless signals. For example, the transceiver may enable communication over millimeter wave (mmWave) frequencies (e.g., 24.25 gigahertz (GHz) and above). However, spurious emissions in the mmWave frequencies, such as those at approximately 32.3 GHz caused by satellite and/or space communications, may cause interference with device communications.

Embodiments herein provide frequency-filtering circuitry that rejects power of a wireless signal having an undesired frequency, while causing a decreased power loss to a wireless signal having a desired frequency. The frequency-filtering circuitry includes distributed elements rather than lumped elements (e.g., capacitors, inductors, resistors, and so on). In particular, the frequency-filtering circuitry may include a low pass filter that rejects at least 5 decibels of power of a wireless signal having a frequency over 32 gigahertz, while causing a power loss of at most 1.1 decibels to a wireless signal having a frequency lower than 29.5 gigahertz. The frequency-filtering circuitry includes a main branch, a first branch coupled to and extending in a same direction as the main branch via a first connecting trace, and a second branch coupled to and extending in an opposite direction with respect to the main branch via a second connecting trace. The first connecting trace intersects to the main branch and the first branch, and the second connecting trace is intersects the main branch and the second branch.

In another embodiment, frequency-filtering circuitry may include a band stop filter that rejects at least 3.5 decibels of power of a wireless signal having a frequency of at least 36.4 gigahertz, while causing a power loss of at most 0.33 decibels to a wireless signal having a frequency lower than 29.5 gigahertz. In particular, the frequency-filtering circuitry includes a main branch, a first circle trace coupled to the main branch via a first connecting trace, and a second circle trace coupled to the main branch via a second connecting trace. The main branch may be disposed on a first layer of a circuit board, and the first and second circle traces may be disposed on a second layer of the circuit board. The first connecting trace intersects the main branch, and the second connecting trace intersects the main branch.

In an additional or alternative embodiment, frequency-filtering circuitry may include a band stop filter that rejects at least 5.4 decibels of power of a wireless signal having a frequency between 36.4 and 41.2 gigahertz, while causing a power loss of at most 0.34 decibels to a wireless signal having a frequency lower than 29.5 gigahertz. In particular, the frequency-filtering circuitry includes a main branch, a first parallel branch coupled to and parallel to the main branch via a first connecting trace, and a second parallel branch coupled to and parallel to the first parallel branch via a second connecting trace. The second parallel branch may be coupled to an electrical ground, providing a low impedance pathway for higher frequency signals (e.g., between 36.4 and 41.2 GHz), thus acting as a shunt. The first connecting trace intersects the main branch and the first parallel branch, and the second connecting trace intersects the first parallel branch and the second parallel branch.

In yet another embodiment, frequency-filtering circuitry may include a band stop filter with an open shunt element that rejects at least 5.3 decibels of power of a wireless signal having a frequency between 36.4 and 50 gigahertz, while causing a power loss of at most 0.28 decibels to a wireless signal having a frequency lower than 29.5 gigahertz. In particular the frequency-filtering circuitry includes a main branch, a first branch coupled to and alongside the main branch via a first connecting trace, and a second branch coupled to and alongside the main branch via a second connecting trace. The first connecting trace intersects the main branch and the first branch, and the second connecting trace intersects the main branch and the second branch.

Because the disclosed frequency-filtering circuitries reject power of wireless signals having a frequency of at least 36.4 gigahertz and cause a decreased power loss at signals having a frequency lower than 29.5 gigahertz, they may be particularly suited for millimeter wave (mmWave) frequency range (e.g., 24.25-300 gigahertz (GHz)) applications. Moreover, using distributed elements, instead of lumped elements, may save space when utilized for mmWave applications. Furthermore, due to height dimensions of the lumped elements, the frequency-filtering circuitry may be moved to deeper (e.g., intermediate) circuit board layers, avoiding the need to dispose the circuitry on a top or surface layer, which may decrease path loss (e.g., from routing traces in deeper layers to the top or surface layer and back). Additionally, lumped element filters for higher frequency (e.g., mmWave) applications may be more expensive (e.g., than lower frequency applications due to lower demand for the components and manufacturing complexities inherent in the higher frequency filters.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, 5th generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. In particular, the transceiver may enable bidirectional communication over a single path while separating signals traveling in each direction from one another (e.g., via a duplexer, such as an electrical balanced duplexer, a double balanced duplexer, or any other suitable form of duplexer). For example, the transceiver 30 may enable frequency division duplexing (FDD), such that the transceiver 30 may isolate a transmitter of the electronic device 10 from a received signal of a first frequency band while isolating a receiver of the electronic device 10 from a transmission signal of a second frequency band (e.g., isolate the transmitter from the receiver, and vice versa).

The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
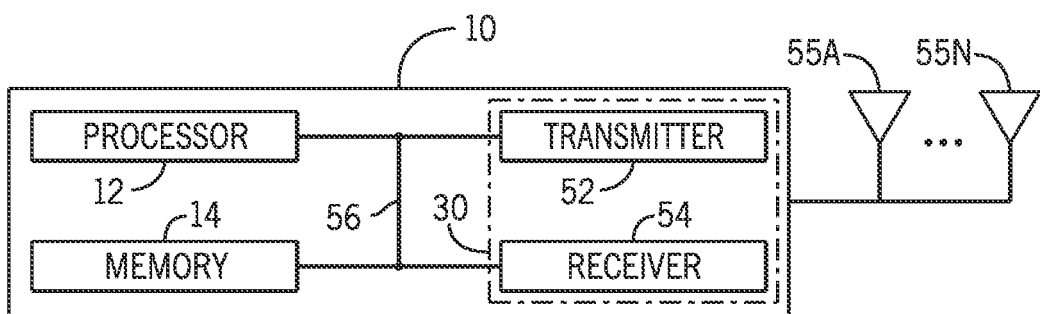
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
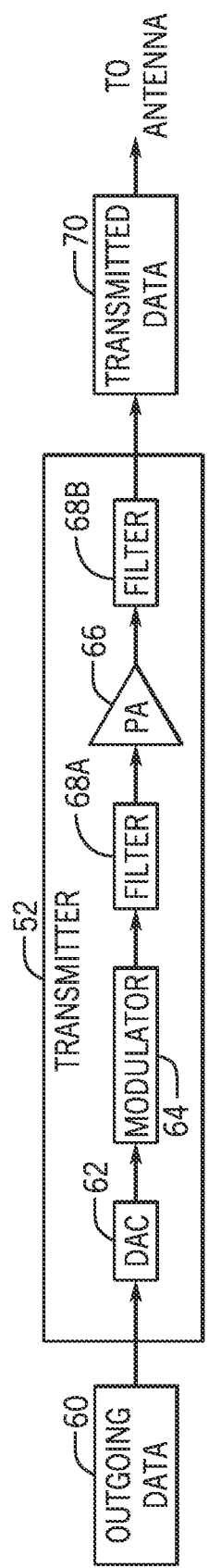
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A first filter 68A (e.g., filter circuitry and/or software) may remove then undesirable noise from the modulated signal. A power amplifier (PA) 66 receives signal the modulated signal from the modulator 64. The power amplifier 66 may amplify the filtered signal to a suitable level to drive transmission of the signal via the one or more antennas 55. A second filter 68B may then remove undesirable noise from the amplified signal to generate transmitted data 70 to be transmitted via the one or more antennas 55. The filters 68A, 68B (which may be collectively referred to as filter 68 herein) may include any suitable filters to remove the undesirable noise from the amplified signal, such as bandpass filters, bandstop filters, low pass filters, high pass filters, and/or decimation filters. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include one or both of the filters 68 if the modulator 64 and/or the power amplifier 66 outputs a signal in or approximately in a desired frequency range or with reduced or minimal noise (such that filtering of the output signal may be unnecessary).

Figure 4:
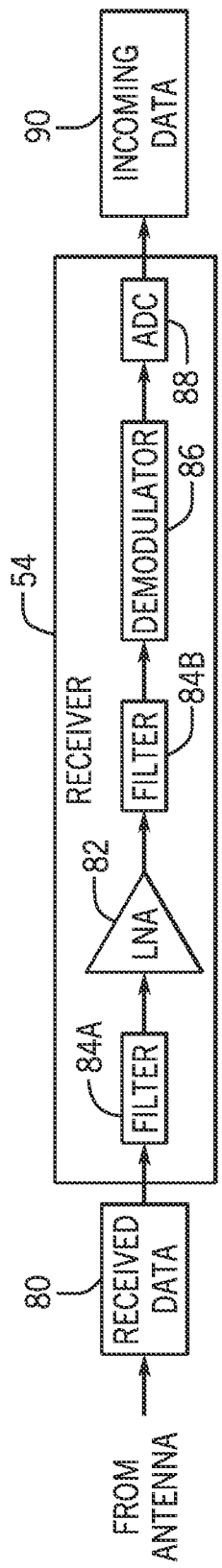
FIG. 4 is a schematic diagram of a receiver of the electronic device of FIG. 1, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A first filter 84A (e.g., filter circuitry and/or software) may remove undesired noise from the analog signal, such as cross-channel interference. The filter 84A may also remove additional signals received by the one or more antennas 55 which are at frequencies other than the desired signal. A low noise amplifier (LNA) 82 may amplify the filtered analog signal to a suitable level for the receiver 54 to process. Similar to the first filter 84A, the second filter 84B may remove undesired noise and/or additional signals received by the one or more antennas 55 which are at frequencies other than the desired signal from the amplified signal. The filters 84A, 84B (collectively referred to as the filter 84 herein) may include any suitable filters to remove the undesired noise or signals from the received signal, such as bandpass filters, bandstop filters, low pass filters, high pass filters, and/or decimation filters. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Embodiments herein provide frequency-filtering circuitry (e.g., a filter) that rejects power of a wireless signal having an undesired frequency while causing a decreased power loss to a wireless signal having a desired frequency using distributed elements, rather than lumped elements (e.g., capacitors, inductors, resistors, and so on). That is, the filter may be made (e.g., solely) of circuit trace, a conducting track on a printed circuit board that connects components electrically and allows electric current to flow with little resistance. For example, the circuit trace may be made of copper, aluminum, or any other suitable conductive material. The filter rejects power of a wireless signal having an undesired frequency, while causing a decreased power loss to a wireless signal having a desired frequency. In some embodiments, the filter may be representative of the filter 68A and/or the filter 68B of the transmitter 52 and/or the filter 84A and/or the filter 68B of the receiver 54.

Figure 5:
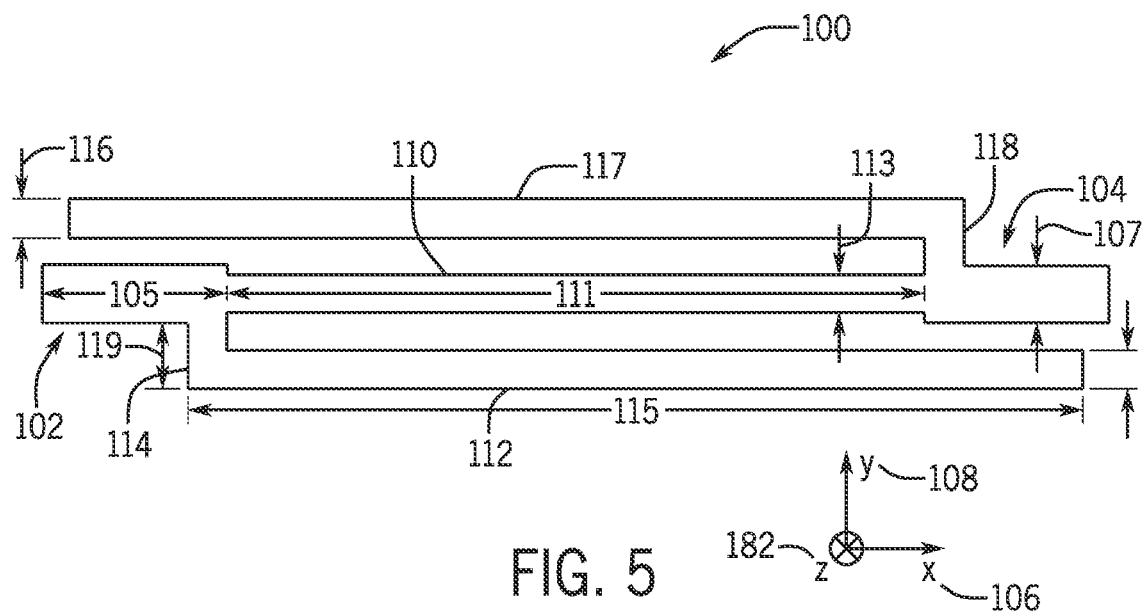
FIG. 5 is diagram of a low pass filter according to embodiments of the present disclosure.

FIG. 5 is diagram of a filter 100 (e.g., a low pass filter) according to embodiments of the present disclosure. The filter 100 may include a distributed-element filter in which capacitance, inductance, and/or resistance are not localized in discrete capacitors, inductors, and/or resistors, as they are in conventional filters or lumped-element models (where these elements are considered to be "lumped" together in one place. A lumped-element filter, while arguably simpler in concept, may become increasingly unreliable with increasing frequency, as may be evidenced by relatively high mmWave frequencies (e.g., 24.25 GHz and above).

As discussed above, the filter 100 may be made of (e.g., solely made of) circuit or signal trace. As such, the filter 100 may be printed on a layer of a printed circuit board (PCB) and conduct electrical signals. In particular, the filter 100 may be made of a flat, narrow part of copper foil that remains after etching the layer of the PCB. While described as made of copper, in additional or alternative embodiments, the filter 100 may be made of any other conductive material, such as aluminum. In some embodiments, the filter 100 may be made of 50Ω trace (such that a characteristic impedance of the trace is 50Ω), though the characteristic impedance may be any suitable impedance (e.g., greater than 0Ω, greater than 10Ω, greater than 50Ω, greater than 100Ω, and so on).

The filter 100 may include a first terminal 102 (e.g., an input terminal) and a second terminal 104 (e.g., an output terminal). While the first terminal 102 may couple to an electrical current source and the second terminal 104 may provide an output current, in alternative embodiments, this may be reversed. As illustrated, the terminals 102, 104 may have a length 105 (e.g., along an x- or length axis 106) and a width 107 (e.g., along a y- or width axis 108) that may be of any suitable dimensions that enable coupling to other circuitry (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on. For example, the length 105 of the terminals 102, 104 may be approximately 200 micrometers (μm) and the width 107 of the terminals 102, 104 may be approximately 62 μm.

The filter 100 may also include a main (e.g., series) branch or trace 110 coupling the first terminal 102 to the second terminal 104. Varying dimensions of the main branch 110 may affect loss of a power of a signal passing through the filter 100 of a desired frequency (e.g., in-band loss) and rejection of a power of a signal to vary passing through the filter 100 of an undesired frequency (e.g., out-of-band rejection). In particular, increasing the length (e.g., along the x-axis 106) of the main branch 110 may increase the in-band loss, while increasing the out-of-band rejection, as discussed in further detail below. As illustrated, the main branch 110 may be approximately 755 μm long (e.g., along the x-axis 106) and approximately 42 μm wide (e.g., along the y-axis 108), though the main branch 110 may be of any suitable dimensions that enable effective in-band loss and out-of-band rejection performance and/or coupling to other circuitry (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on), as discussed in further detail below.

As illustrated, the filter 100 includes a first parallel branch or trace 112 coupled and parallel to, alongside, or coextensive with the main branch 110 via a first connecting trace 114. As with the main branch 110, varying dimensions of the first parallel branch 112 may affect in-band loss and out-of-band rejection. In particular, increasing the length (e.g., along the x-axis 106) of the first parallel branch 112 may increase the in-band loss, while increasing the out-of-band rejection, as discussed in further detail below. As illustrated, the first connecting trace 114 may couple to the main branch 110 at the first terminal 102, and may be approximately orthogonal (e.g., 90°) to or intersect the main branch 110 and the first parallel branch 112, though, in additional or alternative embodiments, the first connecting trace 114 may couple the main branch 110 to the first parallel branch 112 at any suitable angle (e.g., greater than 0°, greater than 30°, greater than 45°, greater than 60°, less than 120°, less than 135°, less than 150°, less than 180°, and so on). As such, the first parallel branch 112 may extend in a direction (e.g., a same direction as the main branch 110) from the first terminal 102 to the second terminal 104 (along the x-axis 106). The first connecting trace 114 may be approximately 72 μm long (e.g., along the y-axis 108) and approximately 42 μm wide (e.g., along the x-axis 106), though the first connecting trace 114 may be of any suitable dimensions that enable coupling the first parallel branch 112 to the main branch 110 (e.g., greater than 0 μm long and greater than 0 μm wide, greater than 10 μm long and greater than 10 μm wide, greater than 50 μm long and greater than 20 μm wide, greater than 100 μm long and greater than 50 μm wide, and so on).

As further illustrated, the first parallel branch 112 may have a length 115 (e.g., along the x-axis 106) and a width 116 (e.g., along the y-axis 108) that may be of any suitable dimensions that enable effective in-band loss and out-of-band rejection performance (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on). For example, the length 115 of the first parallel branch 112 may be approximately 968 μm, and the width 116 may be approximately 42 μm. As illustrated, the first parallel branch 112 is greater in length than the main branch 110, and greater in length than a distance between the first terminal 102 and the second terminal 104. Accordingly, while a first end of the first parallel branch 112 that couples to the first connecting trace 114 is aligned with the first terminal 102 (along the y-axis 108), a second end (or open stub) of the first parallel branch 112 may extend past the second terminal 104 (with respect to the y-axis 108).

Additionally, the filter 100 may include a second parallel branch or trace 117 coupled and parallel to, alongside, or coextensive with the main branch 110 via a second connecting trace 118. In particular, the second connecting trace 118 may extend from the main branch 110 in an opposite direction (e.g., with respect to the y-axis 108 and/or with respect to the main branch 110) than the first connecting trace 114. As with the main branch 110 and the first parallel branch 112, varying dimensions of the second parallel branch 117 may affect in-band loss and out-of-band rejection. In particular, increasing the length (e.g., along the x-axis 106) of the second parallel branch 117 may increase the in-band loss, while increasing the out-of-band rejection, as discussed in further detail below. As illustrated, the second connecting trace 118 may couple to the main branch 110 at the second terminal 104, and may be approximately orthogonal (e.g., 90°) to or intersect the main branch 110 and the second parallel branch 117, though, in additional or alternative embodiments, the second connecting trace 118 may couple the main branch 110 to the second parallel branch 117 at any suitable angle (e.g., greater than 0°, greater than 30°, greater than 45°, greater than 60°, less than 120°, less than 135°, less than 150°, less than 180°, and so on). The second connecting trace 118 may be approximately 72 μm long (e.g., along the y-axis 108) and approximately 42 μm wide (e.g., along the x-axis 106), though the second connecting trace 118 may be of any suitable dimensions that enable coupling the second parallel branch 117 to the main branch 110 (e.g., greater than 0 μm long and greater than 0 μm wide, greater than 10 μm long and greater than 10 μm wide, greater than 50 μm long and greater than 20 μm wide, greater than 100 μm long and greater than 50 μm wide, and so on). As such, the second parallel branch 117 may extend in a direction from the second terminal 104 to the first terminal 102 (along the x-axis 106).

As further illustrated, the second parallel branch 117 may be approximately 968 μm long (e.g., along the x-axis 106) and approximately 42 μm wide (e.g., along the y-axis 108), though the second parallel branch 117 may be of any suitable dimensions that enable effective in-band loss and out-of-band rejection performance (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on), as discussed in further detail below. As illustrated, the second parallel branch 117 is greater in length than the main branch 110, and greater in length than a distance between the first terminal 102 and the second terminal 104. Accordingly, while a first end of the second parallel branch 117 that couples to the second connecting trace 118 is aligned with the second terminal 104 (along the y-axis 108), a second end (or open stub) of the second parallel branch 117 may extend past the first terminal 102 (with respect to the y-axis 108).

Figure 6:
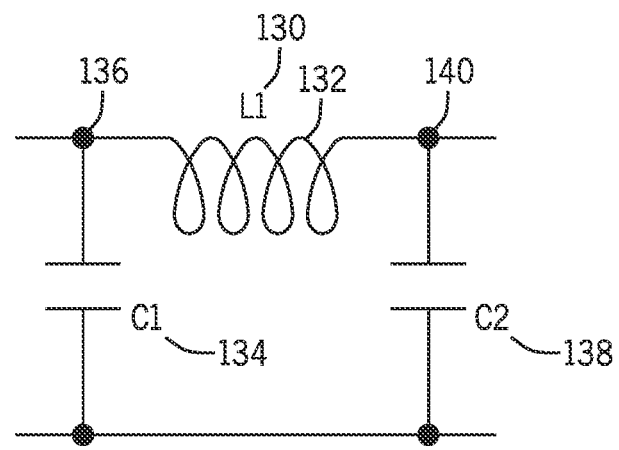
FIG. 6 is a circuit diagram of a lumped-element approximation of the low pass filter of FIG. 5, according to embodiments of the present disclosure.

The main branch 110 and the first and second parallel branches 112, 117 may act as lumped elements to enable the filter 100 to reject power of a wireless signal having an undesired frequency while causing a decreased power loss to a wireless signal having a desired frequency. In particular, discontinuities of in the circuit trace of the transmission line of the filter 100 may present reactive impedances to a wavefront travelling along the filter 100, and these reactances may be configured to serve as approximations for lumped inductors, capacitors or resonators, to result in desired filtering. FIG. 6 is a circuit diagram of a lumped-element approximation of the filter 100, according to embodiments of the present disclosure. The illustrated circuit 130 approximates the main branch 110 as an inductor 132 providing a series inductance L1, the first parallel branch 112 as a first capacitor 134 providing a first parallel capacitance C1 coupled to a first end or node 136 of the inductor 132, and the second parallel branch 117 as a second capacitor 138 providing a second parallel capacitance C2 coupled to a second end or node 140 of the inductor 132.

Figure 7:
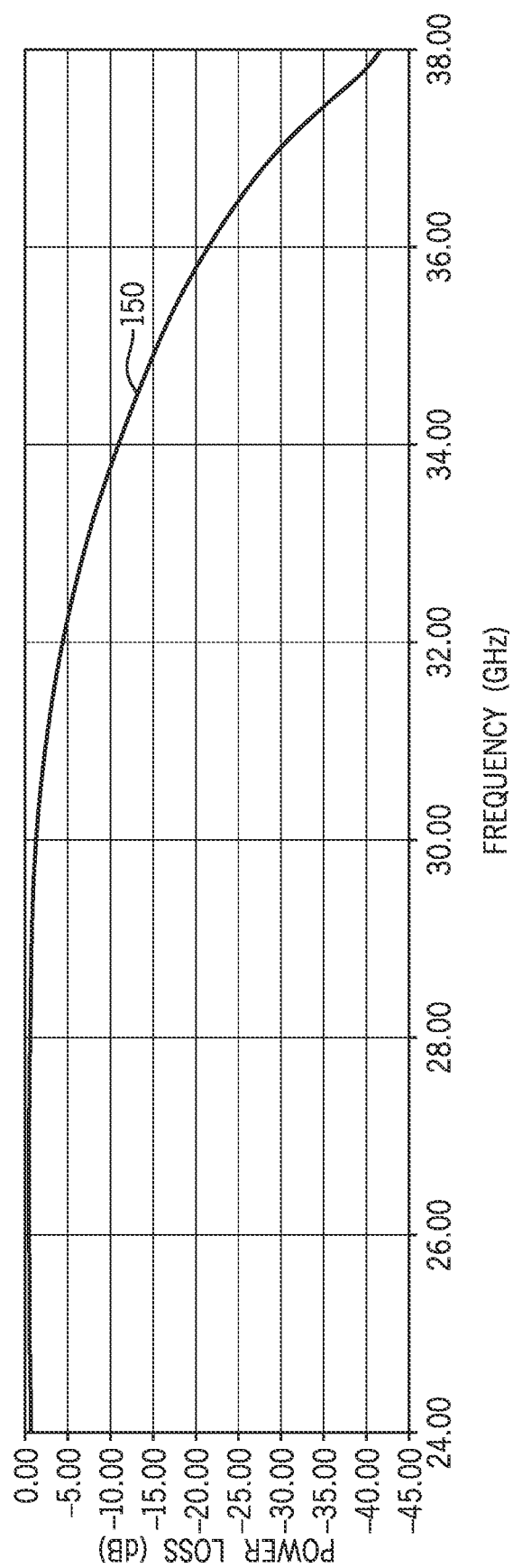
FIG. 7 is a plot showing performance of the filter of FIG. 5, according to embodiments of the present disclosure.

In particular, the filter 100 may act as a low pass filter that rejects at least 5 decibels (dB) of power of a wireless signal having a frequency over 32 gigahertz (GHz), while causing a power loss of at most 1.1 dB to a wireless signal having a frequency lower than 29.5 GHz. FIG. 7 is a plot showing power loss 150 of the filter 100 with varying frequency, according to embodiments of the present disclosure. As illustrated, for frequencies lower than 29.5 GHz, the filter 100 causes a power loss 150 (e.g., an in-band loss) of less than 1.1 dB. For example, at 24.25 GHz, the filter 100 causes a power loss 150 of 0.53 dB, and at 29.5 GHz, the filter 100 causes a power loss of 1.06 dB. At frequencies over 32 GHz, the filter 100 causes a power loss 150 (e.g., an out-of-band rejection) of greater than 5 dB. For example, at 32.30 GHz, the filter 100 causes a power loss 150 of 5.2 dB. The performance shown in the plot may be particularly suited for mmWave operation that may occur over a frequency range at less than or equal to 29.5 GHz (e.g., on the n257 band (26.5-29.5 GHz), the n258 band (24.25-27.5 GHz), the n261 band (27.5-28.35 GHz), and so on) and experience noise at 31 GHz or greater (e.g., at 32.3 GHz as may be caused by satellite and/or space communication).

Figure 8:
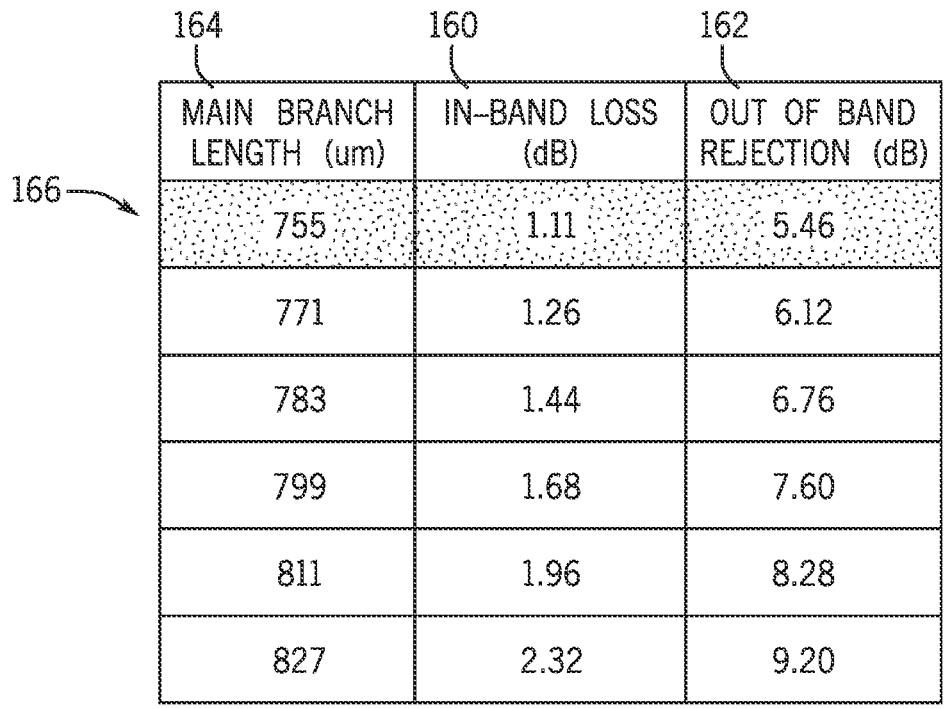
FIG. 8 is a table illustrating in-band loss and out-of-band rejection with varying main branch length, according to embodiments of the present disclosure.
Figure 9:
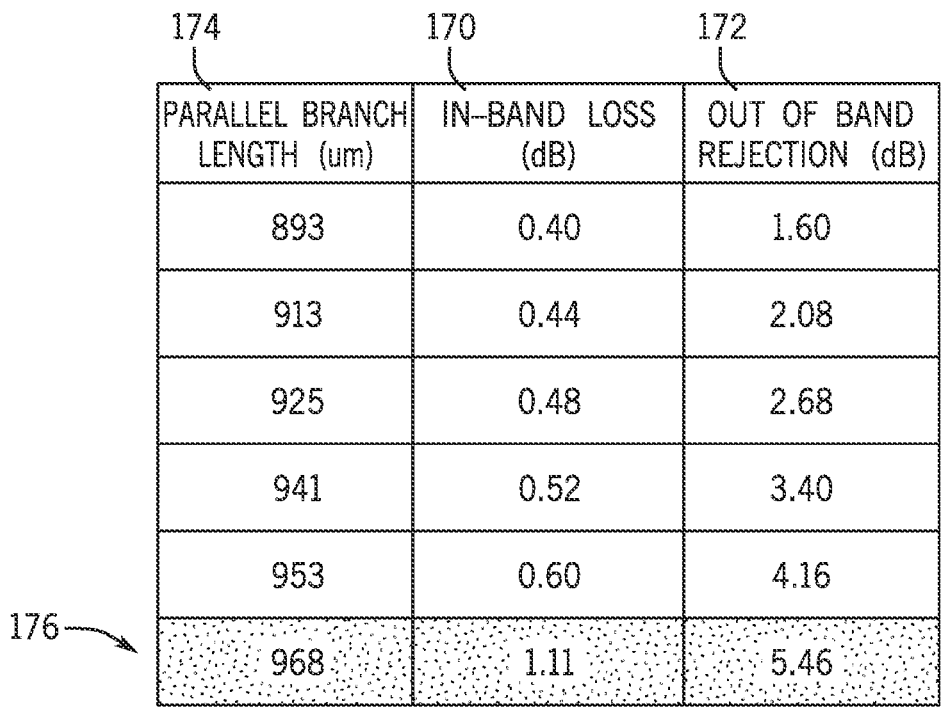
FIG. 9 is a table illustrating in-band loss and out-of-band rejection with varying parallel branch length, according to embodiments of the present disclosure.

As a distributed-element filter, the filter 100, both in-band loss and out-of-band rejection may increase with increasing lengths (e.g., along the x-axis 106) of the main branch 110, the first parallel branch 112, and/or the second parallel branch 117. FIG. 8 is a table illustrating in-band loss 160 and out-of-band rejection 162 with varying main branch length 164, according to embodiments of the present disclosure. As an illustrative example, the filter 100 of FIG. 5, which is approximated by the first row 166 of the table, has a main branch length 164 of 755 μm, has an in-band loss of 1.11 dB (e.g., at approximately 29.5 GHz) and an out-of-band rejection 162 of 5.46 dB (e.g., at approximately 32.3 GHz). FIG. 9 is a table illustrating in-band loss 170 and out-of-band rejection 172 with varying parallel branch length 174, according to embodiments of the present disclosure. The parallel branch length 174 may refer to lengths of both the first parallel branch 112 and the second parallel branch 117 (e.g., where the lengths are approximately equal). As an illustrative example, the filter 100 of FIG. 5, which is approximated by the last row 176 of the table, has a parallel branch length 174 of 968 μm, has an in-band loss of 1.11 dB (e.g., at approximately 29.5 GHz) and an out-of-band rejection 162 of 5.46 dB (e.g., at approximately 32.3 GHz).

Figure 10:
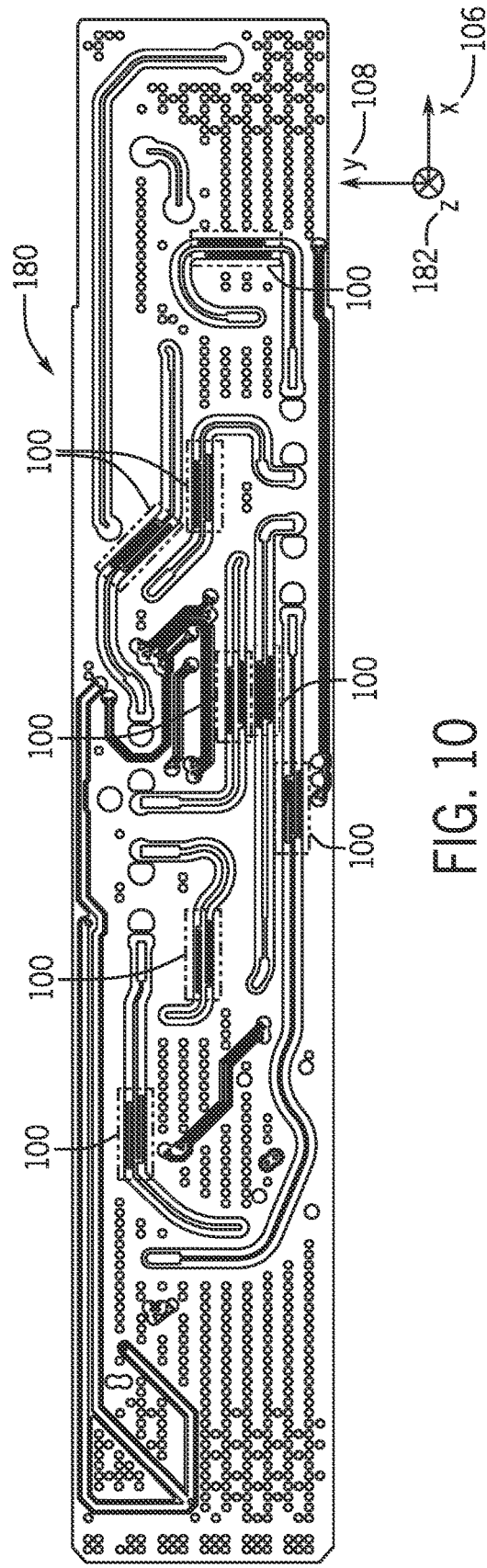
FIG. 10 is a perspective diagram of a layer of a printed circuit board having multiple filters of FIG. 5, according to embodiments of the present disclosure.
Figure 11:
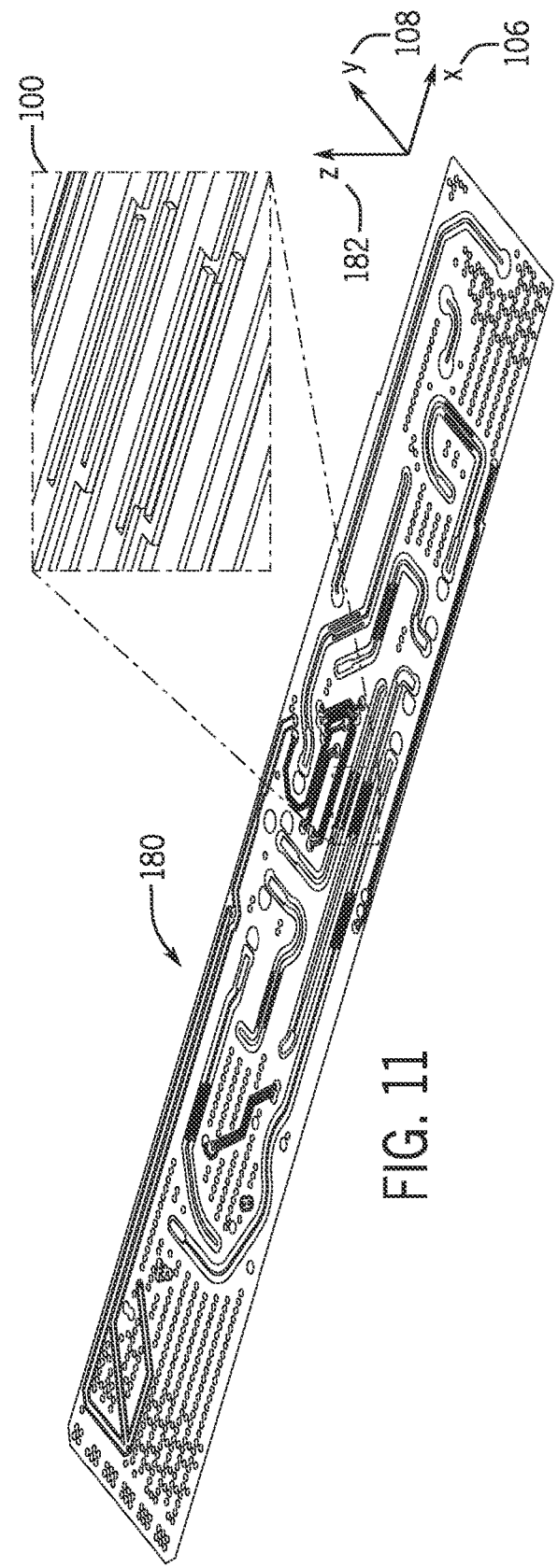
FIG. 11 is an angled view of the layer of FIG. 10, with a focus on the filter of FIG. 5, according to embodiments of the present disclosure.

FIG. 10 is a perspective diagram of a top view (e.g., along a z- or depth axis 182) of a layer 180 of a printed circuit board having multiple filters 100, according to embodiments of the present disclosure. As illustrated, the layer 180 includes eight filters 100, though the layer 180 may include more or less filters 100 (e.g., one or more filters 100, two or more filters 100, ten or more filters 100, and so on) based on the components of the layer 180. For example, the printed circuit board may include or be coupled to one or more transmitters 52, one or more receivers 54, and so on, each of which may include one or more of the filters (e.g., 68, 84) in the form of the low pass filter 100 disposed on the layer 180. FIG. 11 is an angled view of the layer 180, with a focus on the filter 100, according to embodiments of the present disclosure, for better clarity.

Because the filters 100 are made of distributed elements rather than lumped elements, the layer 180 may be an intermediate or deeper layer of the printed circuit board (e.g., that is in-between two other layers of the printed circuit board). That is, the printed circuit board may include at least two surface layers (e.g., a top layer and a bottom layer), and the layer 180 may be in-between the at least two surface layers (e.g., with respect to the z- or depth axis 182).

Figure 12:
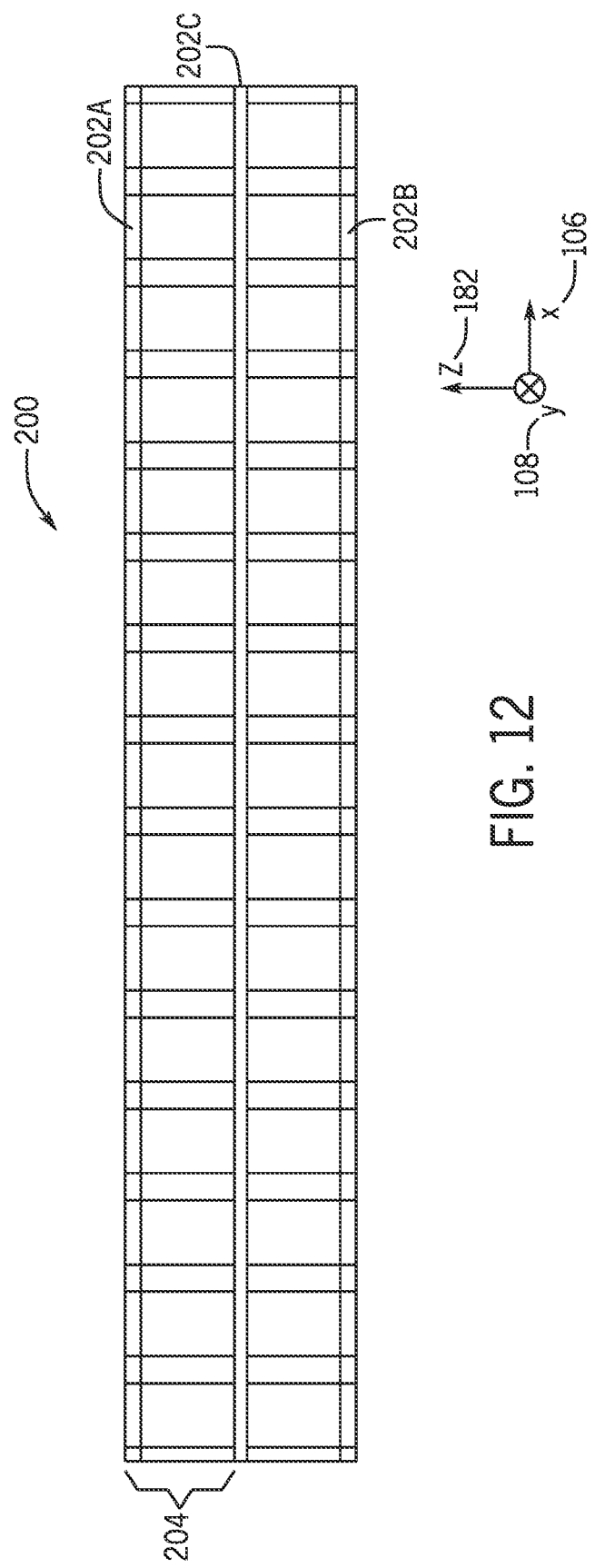
FIG. 12 is a perspective diagram of a printed circuit board having multiple layers, according to embodiments of the present disclosure.

FIG. 12 is a perspective diagram of a printed circuit board (PCB) 200 having multiple layers 202 (illustrated as 202A-C), according to embodiments of the present disclosure. As illustrated, the PCB 200 may have three layers 202, but it should be understood that the PCB 200 may have any suitable number of layers (e.g., one, greater than one, greater than three, greater than five, greater than seven, and so on). In particular, the PCB 200 includes a top (with respect to the z-axis 182) or first surface layer 202A, a bottom (with respect to the z-axis 182) or second surface layer 202B, and an intermediate (with respect to the surface layers 202A, 202B) or deeper layer 202C. While the filter 100 may be disposed on either surface layer 202A, 202B, due to the lower z-dimension or "height" (e.g., along the z-axis 182) of the filter 100, the filter 100 may additionally or alternatively be disposed on the intermediate or deeper layer 202C. For example, the height of the filter 100 may be 15 μm, though the filter 100 may be any suitable height that enables conduction of electrical signals, such as under 5 μm, under 10 μm, under 20 μm, and so on. On the other hand, the heights (e.g., along the z-axis 182) of lumped elements, such as resistors, capacitors, and inductors, may be on the order of greater than 50 μm, greater than 100 μm, greater than 200 μm, greater than 500 μm, and so on. The distances 204 between the layers 202 may be less than the heights of the lumped elements, such as 20 μm or less, 50 μm or less, 70 μm or less, 100 μm or less, and so on. The distances 204 may be filled with pre-preg, a composite material made from "pre-impregnated" fibers and a partially cured polymer matrix, such as epoxy, phenolic resin, and/or thermoplastic mixed with liquid rubbers or resins. The pre-preg may serve as a dielectric between the layers 202. As such, using the distributed-element filter 100 enables disposing the filter 100 in an intermediate or deeper layer (e.g., 202C) of the PCB 200, instead of limiting disposition of the filter 100 on a surface layer (e.g., 202A, 202B).

Advantageously, disposing the filter 100 on an intermediate or deeper layer (e.g., 202C) of the PCB 200 may decrease path loss in wireless signals sent and/or received from the electronic device 10. That is, the transceiver 30 (or other components of the transceiver 30) and/or the antennas 55 may be disposed on a surface layer (e.g., 202A, 202B) of the PCB 200, as these components typically have greater heights (e.g., along the z-axis 182). However, because the transceiver 30 and the antennas 55 may have different impedance characteristics, a wireless signals sent and/or received via the transceiver 30 and the antennas 55 may undergo impedance transformation, which may be performed by circuitry disposed on an intermediate or deeper layer (e.g., 202C). Thus, for lumped-element filters disposed on a surface layer (e.g., 202A) of the PCB 200, the wireless signal may travel from the surface layer (e.g., from the transceiver 30 or the antennas 55) to an intermediate layer (e.g., 202C) (for impedance transformation) and to another surface layer (e.g., 202A) or back to the same surface layer (e.g., 202A) of the PCB 200 (e.g., to the antennas 55 or the transceiver 30) in order to be sent or received, causing some path loss to the wireless signal. For the distributed-element filter 100 disposed on an intermediate layer, the path loss may be decreased due to having to travel only between one surface layer and the intermediate layer for transmission or reception.

Figure 13:
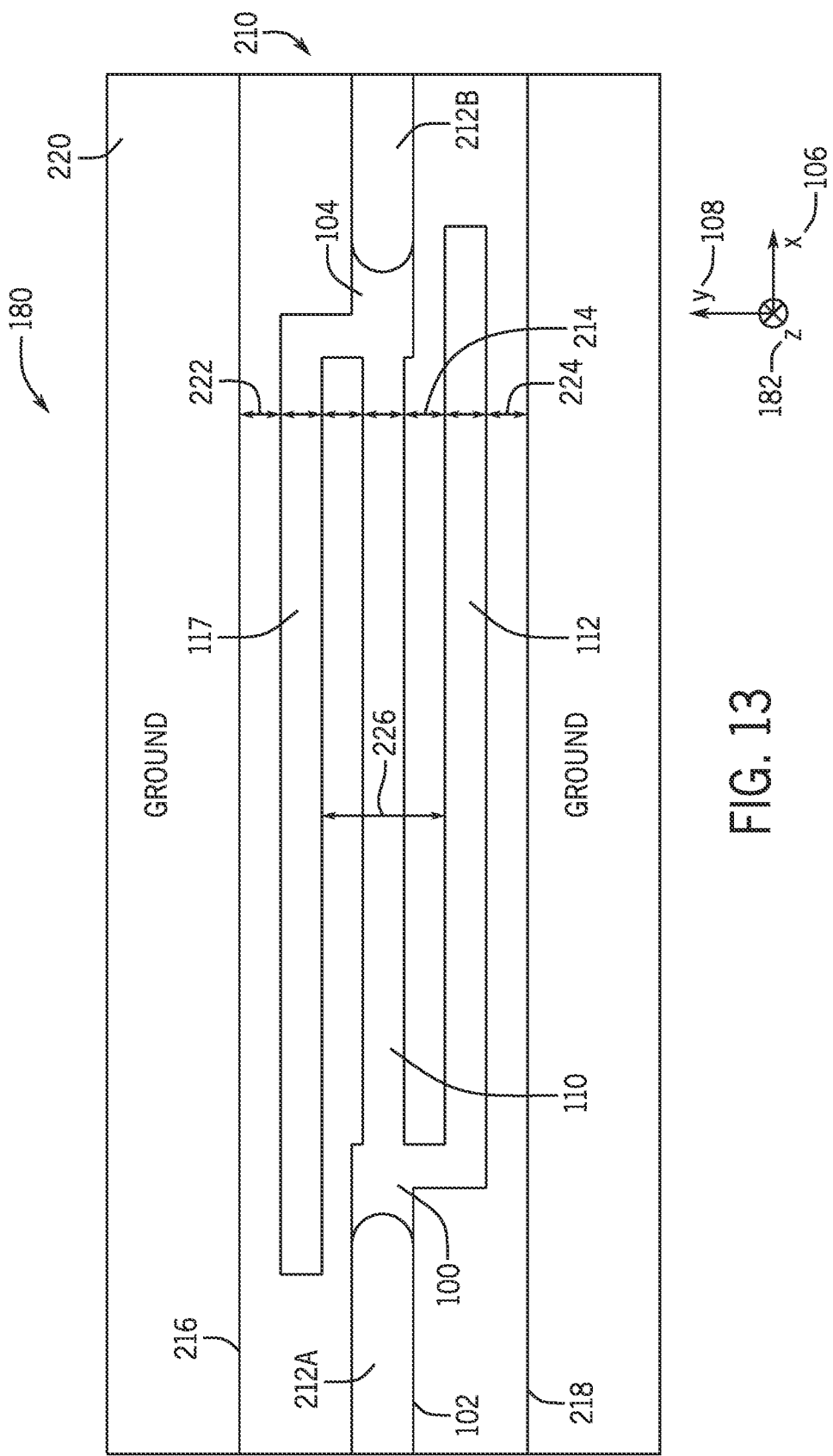
FIG. 13 is a diagram illustrating the filter of FIG. 5 disposed in a routing channel of the layer of FIG. 10, according to embodiments of the present disclosure.

Moreover, the width (e.g., along the y-axis 108) of the filter 100 may be compact and space-efficient for placement in certain circuit board designs. FIG. 13 is a diagram illustrating the filter 100 disposed in a routing channel 210 of the layer 180 (e.g., an intermediate layer 202C) of the PCB 200, according to embodiments of the present disclosure. The routing channel 210 may provide a channel in the layer 180 for circuit trace or other suitable conductors to be etched, disposed, and/or laminated onto. As illustrated, the filter 100 is disposed in the routing channel 210, and coupled to a first component 212A (via the first terminal 102) and a second component 212B (via the second terminal 104). As shown in FIG. 5, each of the main branch 110, the first parallel branch 112, and the second parallel branch 117 may have a width (e.g., along the y-axis 108) of 42 μm. Moreover, each of the branches 110, 112, 117 are separated by a gap 214 of 40 μm. Additionally, the routing channel 210 is bordered (e.g., along a first edge 216 and a second edge 218) by electrical grounds 220. To enable a buffer between the filter 100 (e.g., to enable effective operation of the filter 100 and/or to ensure that the filter 100 does not experience a ground fault or a short circuit), there is a gap 222 of 40 μm from the first parallel branch 112 to the ground 220, and a gap 224 of 40 μm from the second parallel branch 117 to the ground 220. Accordingly, the total width (e.g., along the y-axis 108) of the filter 100, from the first parallel branch 112 to the second parallel branch 117, is approximately 206 μm, and a distance 226 between the first parallel branch 112 and the second parallel branch 117 (e.g., along the y-axis 108) being approximately 122 μm. With the gaps 222, 224 that buffer the filter 100 from the ground 220, the width is approximately 286 μm. That is, the filter 100 may conveniently fit into a routing channel 210 having a width of at least 286 μm. It should be understood that the various widths of the main branch 110, the first parallel branch 112, the second parallel branch 117, the gaps 214, 222, 224, and the routing channel 210 are used as examples, and any other suitable widths are contemplated (e.g., 1 μm or greater, 5 μm or greater, 10 μm or greater, 20 μm or greater, 40 μm or greater, 50 μm or greater, 100 μm or greater, 200 μm or greater, 300 μm or greater, and so on).

Figure 14:
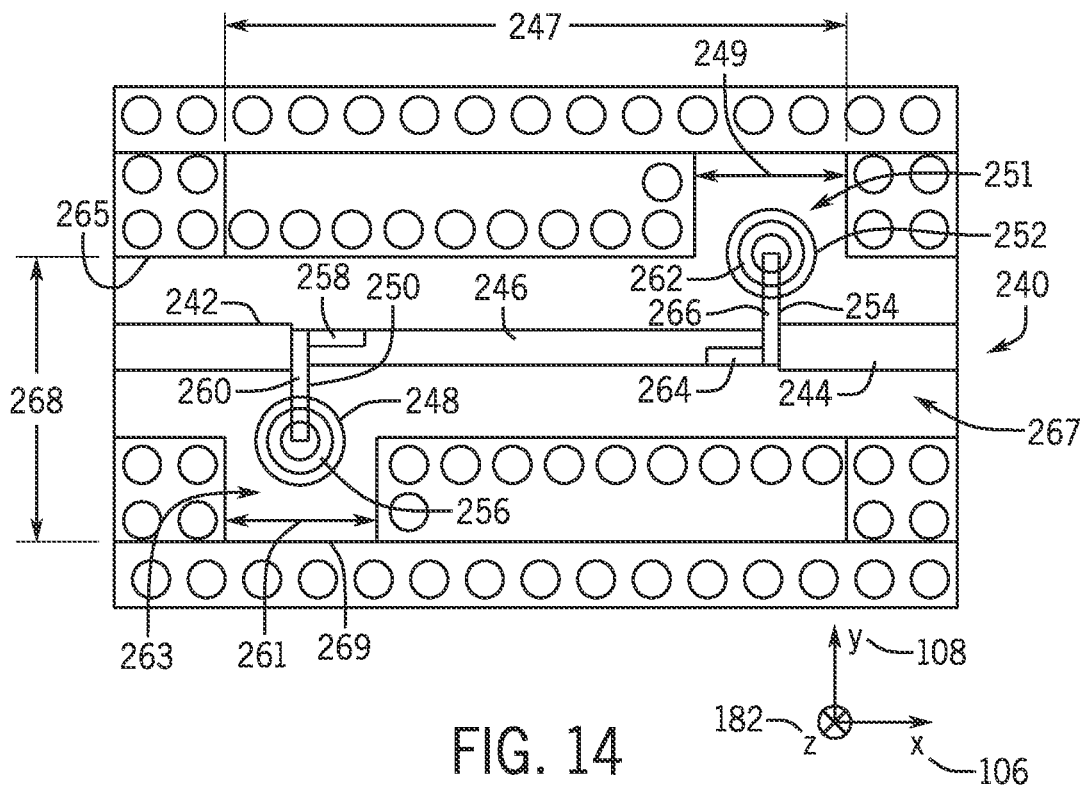
FIG. 14 is a diagram of a band stop filter, according to embodiments of the present disclosure.

FIG. 14 is a diagram of a band stop filter 240, according to embodiments of the present disclosure. As with the filter 100 of FIG. 5, the band stop filter 240 may include a distributed-element filter rather than a lumped-element filter. The filter 240 may include a first terminal 242 (e.g., an input terminal) and a second terminal 244 (e.g., an output terminal). While the first terminal 242 may couple to an electrical current source and the second terminal 244 may provide an output current, in alternative embodiments, this may be reversed. As with the filter 100 of FIG. 5, the terminals may be approximately 200 µm long (e.g., along an x- or length axis 106) and approximately 72 µm wide (e.g., along a y- or width axis 108), though the terminals 242, 244 may be of any suitable dimensions that enable coupling to other circuitry.

The filter 240 may also include a main (e.g., series) branch or trace 246 coupling the first terminal 242 to the second terminal 244. Varying dimensions of the main branch 246 may affect loss of a power of a signal passing through the filter 240 of a desired frequency (e.g., out-of-band loss) and rejection of a power of a signal to vary passing through the filter 240 of an undesired frequency (e.g., in-band rejection). In particular, increasing the length (e.g., along the x-axis 106) of the main branch 246 may increase the out-of-band loss, while increasing the in-band rejection, as discussed in further detail below. The main branch 246 may be approximately 1.1 millimeters (mm) long or less (e.g., along the x-axis 106), and approximately 42 µm wide (e.g., along the y-axis 108), though the main branch 246 may be of any suitable dimensions that enable effective out-of-band loss and in-band rejection performance and/or coupling to other circuitry (e.g., greater than 0 µm long and greater than 0 µm wide, greater than 10 µm long and greater than 10 µm wide, greater than 100 µm long and greater than 50 µm wide, greater than 200 µm long and greater than 100 µm wide, greater than 500 µm long and greater than 300 µm wide, and so on), as discussed in further detail below.

As illustrated, the filter 240 includes a first circle trace 248 coupled to the main branch 246 via a first connecting trace 250. As with the main branch 246, varying dimensions of the first circle trace 248 may affect out-of-band loss and in-band rejection. In particular, increasing the radius of the first circle trace 248 may increase the out-of-band loss, while increasing the in-band rejection, as discussed in further detail below. As illustrated, the first connecting trace 250 may couple to the main branch 246 at the first terminal 242, and may be approximately orthogonal (e.g., 90°) to or intersect the main branch 246, though, in additional or alternative embodiments, the first connecting trace 250 may couple the main branch 246 to the first circle trace 248 at any suitable angle. In some embodiments, the first connecting trace 250 may have similar dimension as the first connecting trace 114 of the filter 100 of FIG. 5. As further illustrated, the first circle trace 248 may have a diameter of less than approximately 0.27 mm, though the first circle trace 248 may be of any suitable dimensions that enable effective out-of-band loss and in-band rejection performance (e.g., greater than 0 µm in diameter, greater than 10 µm in diameter, greater than 50 µm in diameter, greater than 100 µm in diameter, greater than 200 µm in diameter, greater than 500 µm in diameter, and so on), as discussed in further detail below.

Additionally, the filter 240 may include a second circle trace 252 coupled to the main branch 246 via a second connecting trace 254. As with the main branch 246, varying dimensions of the second circle trace 252 may affect out-of-band loss and in-band rejection. In particular, increasing the radius of the second circle trace 252 may increase the out-of-band loss, while increasing the in-band rejection. As illustrated, the second connecting trace 254 may couple to the main branch 246 at the second terminal 104, and may be approximately orthogonal (e.g., 90°) to or intersect the main branch 246, though, in additional or alternative embodiments, the second connecting trace 254 may couple the main branch 246 to the second circle trace 252 at any suitable angle. In some embodiments, the second connecting trace 254 may have similar dimensions as the first connecting trace 250, and the second circle trace 252 may have similar dimensions as the first circle trace 248.

Moreover, the first circle trace 248 may be disposed on a lower layer of a printed circuit board, and be coupled to a first trace rod 256 that extends from the first circle trace 248 upward (e.g., along the z-axis 182) to a higher layer of the printed circuit board. On the higher layer, the first trace rod 256 may be coupled to a first stub 258 via a third connecting trace 260. As illustrated, the first stub 258 may extend from the third connecting trace 260 in a direction from the first terminal 242 to the second terminal 244 along the x-axis 106. As with the first circle trace 248, varying dimensions of the first stub 258 may affect out-of-band loss and in-band rejection. In particular, increasing a length of the first stub 258 may increase the out-of-band loss, while increasing the in-band rejection, as discussed in further detail below. As illustrated, the third connecting trace 260 may be approximately orthogonal (e.g., 90°) to or intersect the main branch 246 and the first stub 258, though, in additional or alternative embodiments, the third connecting trace 260 may couple the main branch 246 to the first stub 258 via the first trace rod 256 at any suitable angle. In some embodiments, the third connecting trace 260 may have similar dimensions as the first connecting trace 250. As further illustrated, the first stub 258 may have a length (along the x-axis 106) of less than approximately 0.27 mm, though the first stub 258 may be of any suitable dimensions that enable effective out-of-band loss and in-band rejection performance (e.g., greater than 0 µm, greater than 10 µm, greater than 50 µm, greater than 100 µm, greater than 200 µm, greater than 500 µm, and so on), as discussed in further detail below.

Moreover, the second circle trace 252 may be disposed on the lower layer of a printed circuit board, and be coupled to a second trace rod 262 that extends from the second circle trace 252 upward (e.g., along the z-axis 182) to the higher layer of the printed circuit board. On the higher layer, the second trace rod 262 may be coupled to a second stub 264 via a fourth connecting trace 266. As illustrated, the second stub 264 may extend from the fourth connecting trace 266 in a direction from the second terminal 244 to first terminal 242 along the x-axis 106. As with the second circle trace 252, varying dimensions of the second stub 264 may affect out-of-band loss and in-band rejection. In particular, increasing a length of the second stub 264 may increase the out-of-band loss, while increasing the in-band rejection, as discussed in further detail below. As illustrated, the fourth connecting trace 266 may be approximately orthogonal (e.g., 90°) to or intersect the main branch 246 and the second stub 264, though, in additional or alternative embodiments, the fourth connecting trace 266 may couple the main branch 246 to the second stub 264 via the second trace rod 262 at any suitable angle. In some embodiments, the fourth connecting trace 266 may have similar dimensions as the second connecting trace 254. As further illustrated, the second stub 264 may have a length (along the x-axis 106) of less than a width 261 of an accommodating space 263 of approximately 0.27 mm, though the second stub 264 may be of any suitable dimensions that enable effective out-of-band loss and in-band rejection performance, as discussed in further detail below.

Additionally, an edge 265 of a channel 267 in which the main branch 246 is disposed may be a distance 268 of approximately 0.51 mm away from an edge 269 of the accommodating space 263 (along the y-axis 108), though the distance 268 may be of any suitable dimensions that enable effective out-of-band loss and in-band rejection performance (e.g., greater than 0.1 mm, greater than 0.25 mm, greater than 0.5 mm, greater than 1 mm, greater than 2 mm, greater than 5 mm, and so on).

Figure 15A:
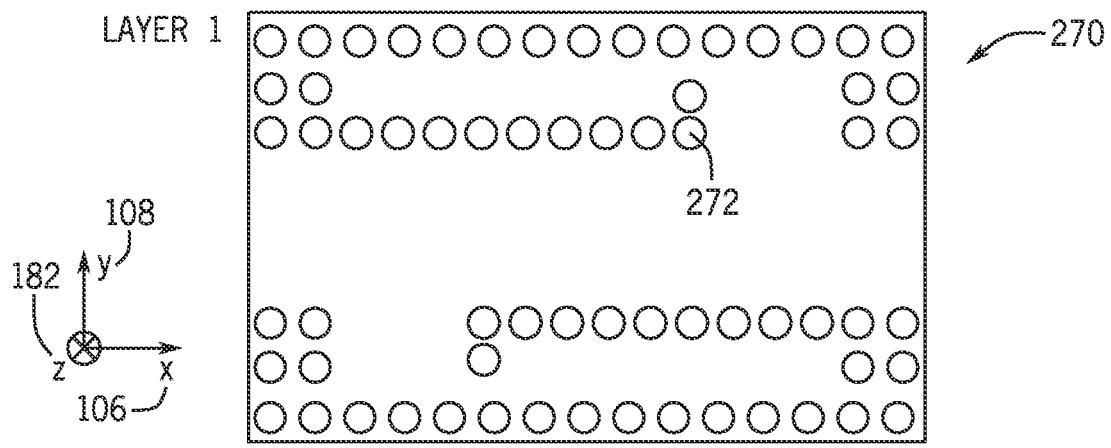
FIG. 15A is a diagram of a top view of a first layer of a printed circuit board having the filter of FIG. 14, according to embodiments of the present disclosure.

While the first and second stubs 258, 264 may be disposed on a higher layer than the main branch 246, there may be layers between the first and second stubs 258, 264 and the main branch 246. For example, FIGS. 15A-F illustrated distribution of the filter 240 among multiple layers of a printed circuit board. In particular, FIG. 15A is a diagram of a top view of a first layer (Layer 1) 270 of the printed circuit board having the filter 240, according to embodiments of the present disclosure. The first layer 270 may be a top layer (with respect to the z-axis 182) of the printed circuit board, and may include vias 272 that couple circuitry of the first layer 270 to other layers. As illustrated, the first layer 270 may not include any components of the filter 240.

Figure 15B:
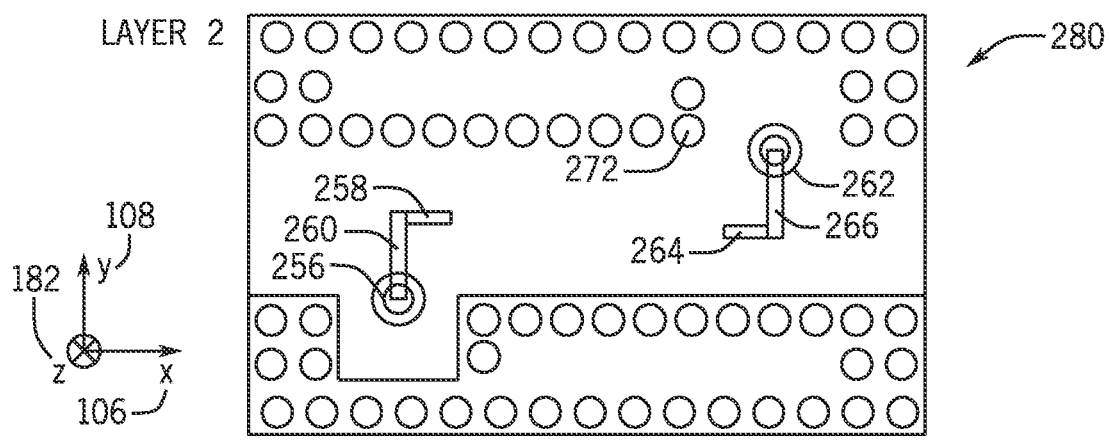
FIG. 15B is a diagram of a top view of a second layer of the printed circuit board having the filter of FIG. 14, according to embodiments of the present disclosure.

FIG. 15B is a diagram of a top view of a second layer (Layer 2) 280 of the printed circuit board having the filter 240, according to embodiments of the present disclosure. The second layer 280 may be disposed below the first layer 270 (with respect to the z-axis 182). As illustrated, the second layer 280 may include the first stub 258 and the third connecting trace 260 that couples the first stub 258 to the first trace rod 256. Similarly, the second layer 280 may also include the second stub 264 and the fourth connecting trace 266 that couples the second stub 264 to the second trace rod 262.

Figure 15C:
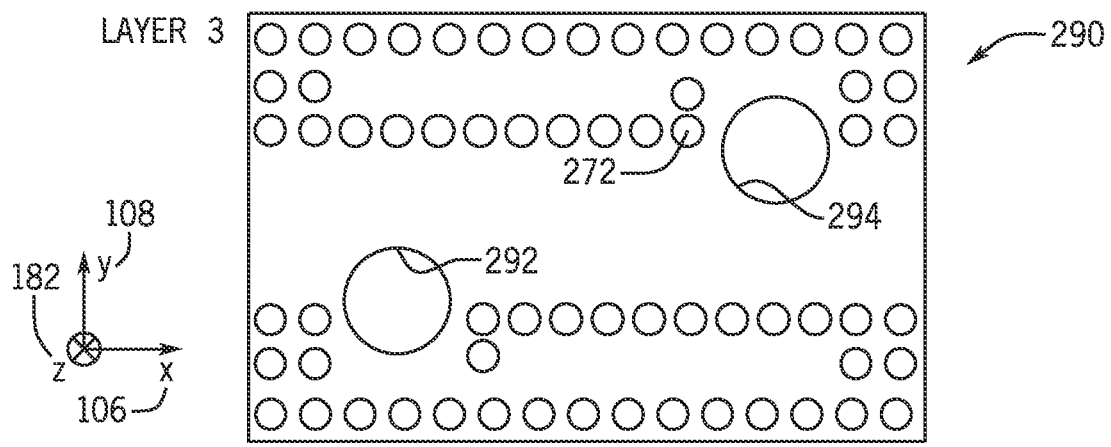
FIG. 15C is a diagram of a top view of a third layer of the printed circuit board having the filter of FIG. 14, according to embodiments of the present disclosure.

FIG. 15C is a diagram of a top view of a third layer (Layer 3) 290 of the printed circuit board having the filter 240, according to embodiments of the present disclosure. The third layer 290 may be disposed below the second layer 280 (with respect to the z-axis 182). As illustrated, the third layer 290 may not include any components of the filter 240, but may include a first hole 292 for the first trace rod 256 to pass through and a second hole 294 for the second trace rod 262 to pass through.

Figure 15D:
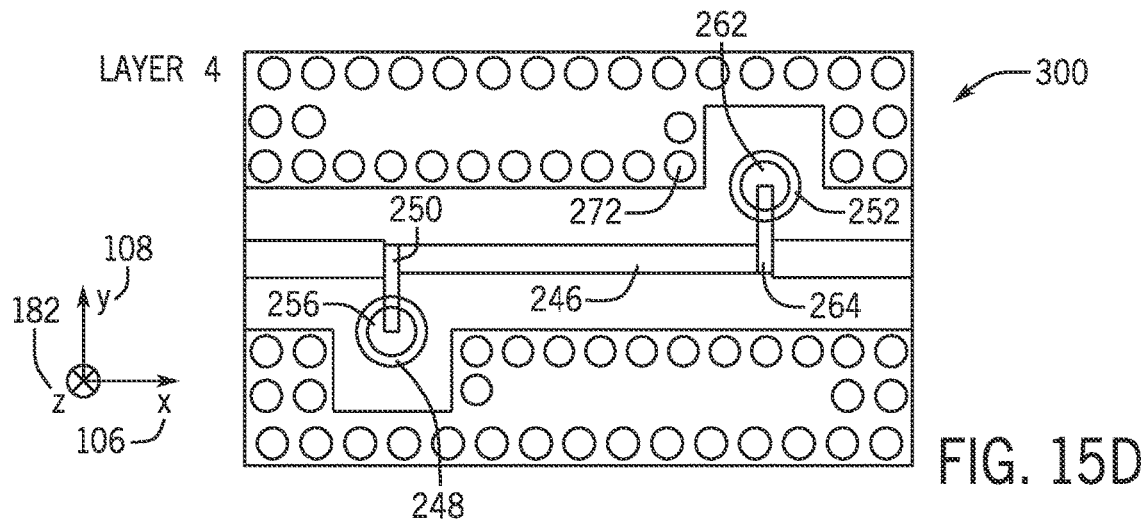
FIG. 15D is a diagram of a top view of a fourth layer of the printed circuit board having the filter of FIG. 14, according to embodiments of the present disclosure.

FIG. 15D is a diagram of a top view of a fourth layer (Layer 4) 300 of the printed circuit board having the filter 240, according to embodiments of the present disclosure. The fourth layer 300 may be disposed below the third layer 290 (with respect to the z-axis 182). As illustrated, the fourth layer 300 may include the main branch 246 coupled to the first circle trace 248 via the first connecting trace 250, and coupled to the second circle trace 252 via the second connecting trace 254. The fourth layer 300 may also include the first trace rod 256 coupled to the first circle trace 248, and the second trace rod 262 coupled to the second circle trace 252.

Figure 15E:
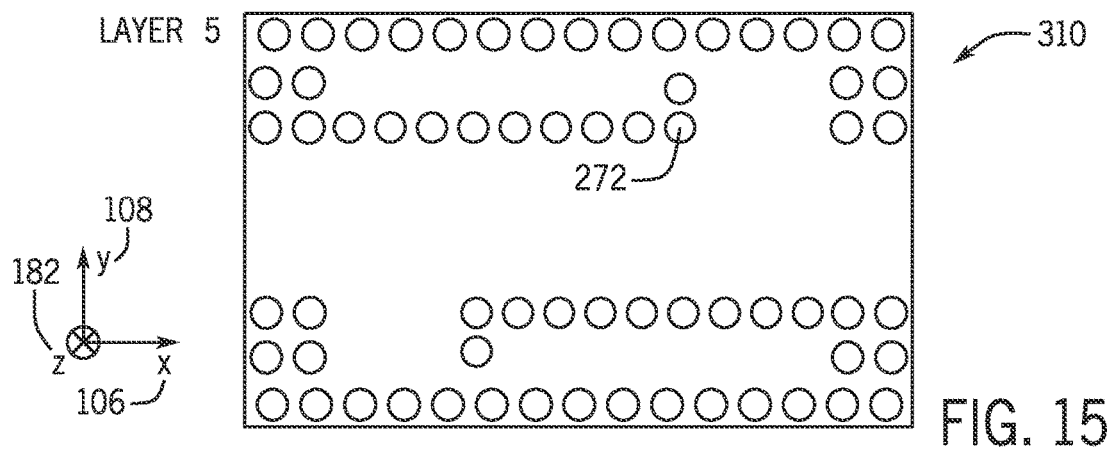
FIG. 15E is a diagram of a top view of a fifth layer of the printed circuit board having the filter of FIG. 14, according to embodiments of the present disclosure.

FIG. 15E is a diagram of a top view of a fifth layer (Layer 5) 310 of the printed circuit board having the filter 240, according to embodiments of the present disclosure. The fifth layer 310 may be disposed below the fourth layer 300 and be the bottom of the printed circuit board (with respect to the z-axis 182). As illustrated, the fifth layer 310 may not include any components of the filter 240.

Figure 15F:
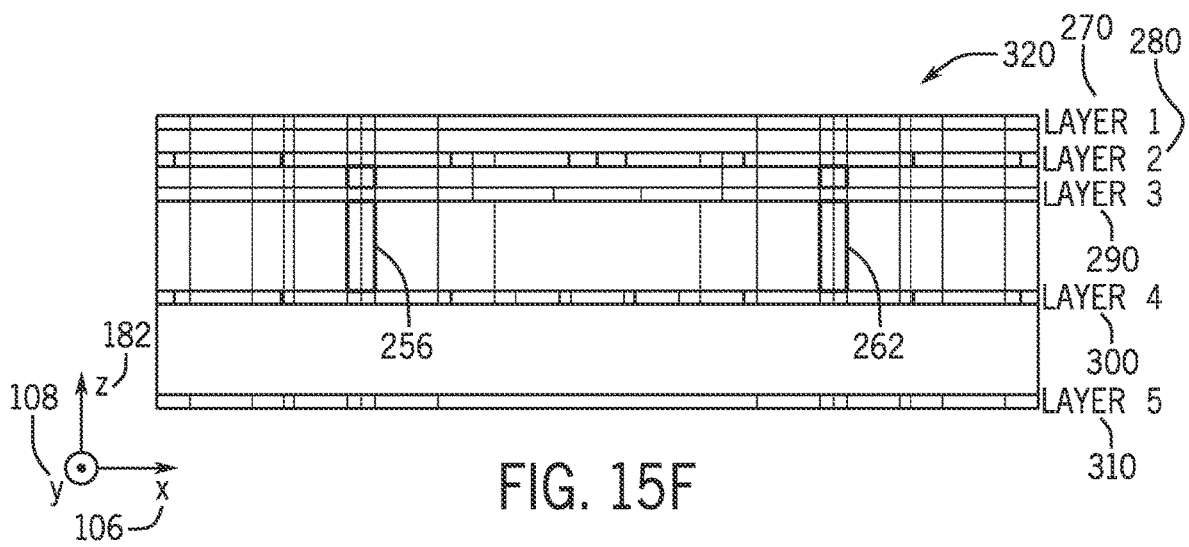
FIG. 15F is a diagram of a side view of the printed circuit board having the filter of FIG. 14, according to embodiments of the present disclosure.

FIG. 15F is a diagram of a side view of the printed circuit board (PCB) 320 having the filter 240, according to embodiments of the present disclosure. As illustrated and described above, the PCB 320 includes the first layer 270, the second layer 280, the third layer 290, the fourth layer 300, and the fifth layer 310, though in additional or alternatively embodiments, the PCB 320 may include any suitable number (e.g., more or less) layers, such as three layers, four layer, more than five layers, and so on. Pre-preg may be disposed between the layers and serve as a dielectric. As further illustrated, the first trace rod 256 and the second trace rod 262 extend from the fourth layer 300 to the second layer 280. Because the filter 240 may be disposed on intermediate or deeper layers (e.g., the second layer 280 and the fourth layer 300) of a printed circuit board (e.g., 320), path loss may be decreased in wireless signals sent and/or received from the electronic device 10, as discussed with respect to FIG. 12 above.

The main branch 246, the first and second circle traces 248, 252, and the first and second stubs 258, 264 may act as lumped elements to enable the filter 240 to reject power of a wireless signal having an undesired frequency while causing a decreased power loss to a wireless signal having a desired frequency. In particular, the main branch 246 may act as the inductor L1 (132), the first circle trace 248 and the first stub 258 as the first capacitor C1 (134) coupled to a first end or node 136 of the inductor 132, and the second circle trace 252 and the second stub 264 as the second capacitor C2 (138) coupled to a second end or node 140 of the inductor 132, as shown in the circuit diagram of the lumped-element approximation of FIG. 6.

Figure 16:
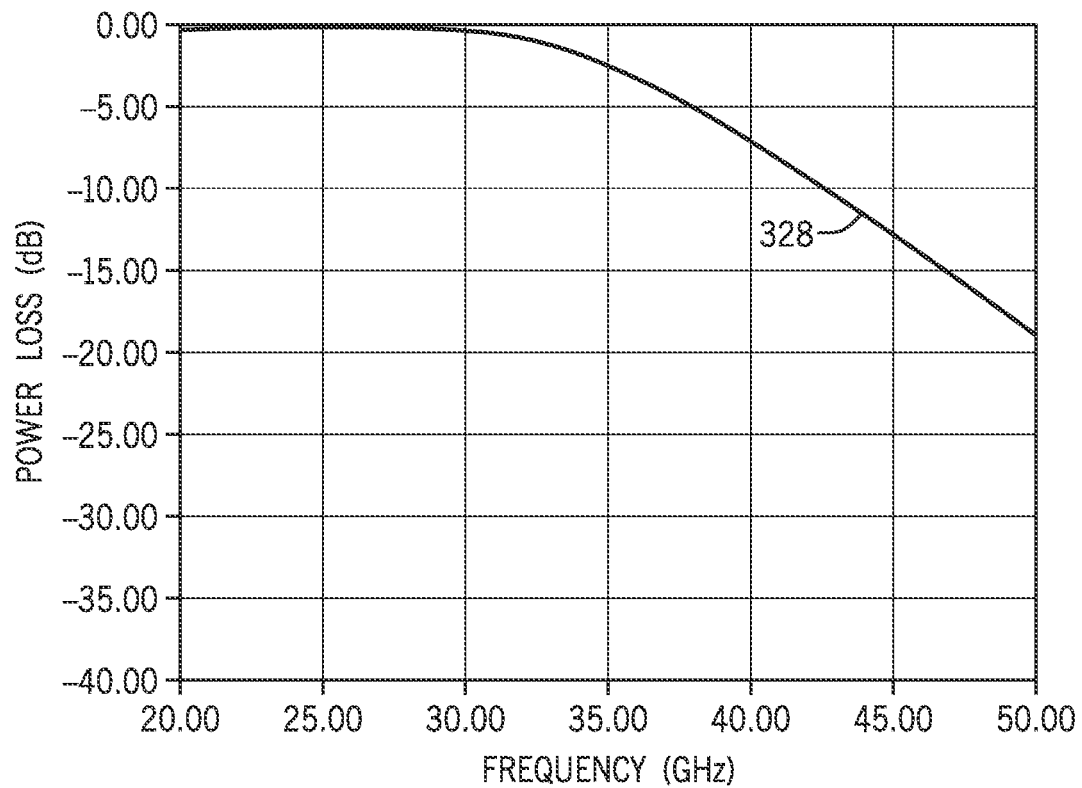
FIG. 16 is a plot showing power loss of the filter of FIG. 14 with varying frequency, according to embodiments of the present disclosure.

In particular, the filter 240 may act as a band stop filter that rejects at least 3.5 dB of power of a wireless signal having a frequency of at least 36.4 GHz, while causing a power loss of at most 0.33 dB to a wireless signal having a frequency lower than 29.5 GHz. FIG. 16 is a plot showing power loss 328 of the filter 240 with varying frequency, according to embodiments of the present disclosure. As illustrated, for frequencies lower than 29.5 GHz, the filter 240 causes a power loss 328 (e.g., an out-of-band loss) of at most 0.33 dB. For example, at 26.25 GHz, the filter 240 causes a power loss 328 of 0.18 dB, and at 29.5 GHz, the filter 240 causes a power loss 328 of 0.32 dB. At frequencies of at least 36.4 GHz, the filter 240 causes a power loss 328 (e.g., an in-band rejection) of greater than 3.5 dB. For example, at 36.4 GHz, the filter 240 causes a power loss 328 of 3.6 dB. The performance shown in the plot may be particularly suited for mmWave operation that may occur over a frequency range at less than or equal to 29.5 GHz and experience noise at 31 GHz or greater (e.g., at 32.3 GHz as may be caused by satellite and/or space communication).

Figure 17:
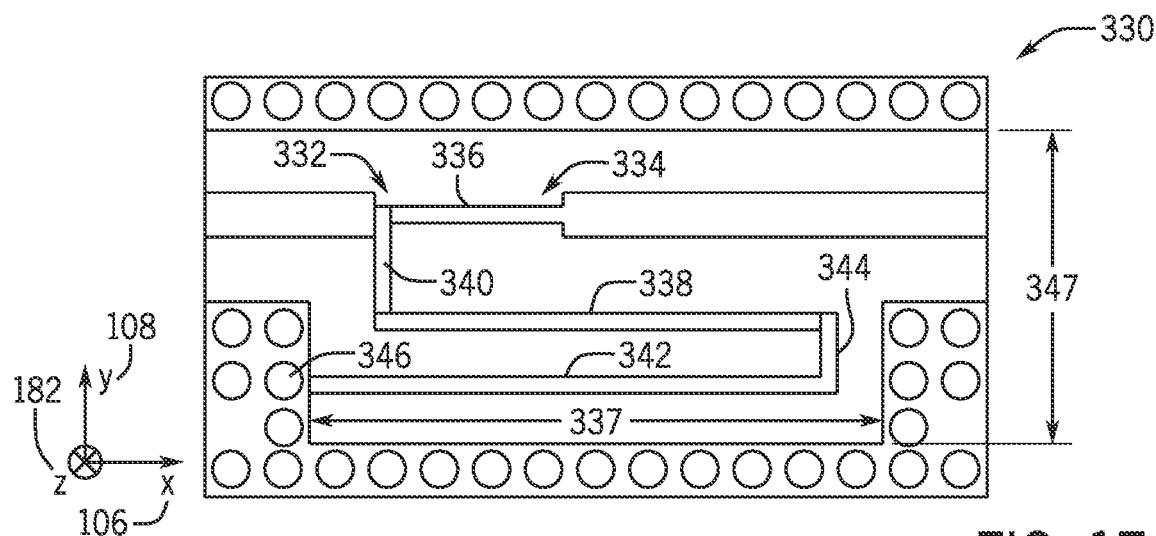
FIG. 17 is a diagram of a band stop filter, according to embodiments of the present disclosure.

FIG. 17 is a diagram of a band stop filter 330, according to embodiments of the present disclosure. As with the filter 100 of FIG. 5, the band stop filter 330 may include a distributed-element filter rather than a lumped-element filter. The filter 330 may include a first terminal 332 (e.g., an input terminal) and a second terminal 334 (e.g., an output terminal). While the first terminal 332 may couple to an electrical current source and the second terminal 334 may provide an output current, in alternative embodiments, this may be reversed.

The filter 330 may also include a main (e.g., series) branch trace 336 coupling the first terminal 332 to the second terminal 334. Varying dimensions of the main branch 336 may affect loss of a power of a signal passing through the filter 330 of a desired frequency (e.g., out-of-band loss) and rejection of a power of a signal to vary passing through the filter 330 of an undesired frequency (e.g., in-band rejection). In particular, increasing the length (e.g., along the x-axis 106) of the main branch 336 may increase the out-of-band loss, while increasing the in-band rejection, as discussed in further detail below. The main branch 336 may be approximately 1.1 mm long or less (e.g., 0.3 mm along the x-axis 106), and approximately 42 µm wide (e.g., along the y-axis 108), though the main branch 336 may be of any suitable dimensions that enable effective out-of-band loss and in-band rejection performance and/or coupling to other circuitry (e.g., greater than 0 µm long and greater than 0 µm wide, greater than 10 µm long and greater than 10 µm wide, greater than 100 µm long and greater than 50 µm wide, greater than 200 μm long and greater than 100 μm wide, greater than 500 μm long and greater than 300 μm wide, and so on), as discussed in further detail below.

As illustrated, the filter 330 includes a first parallel branch 338 coupled to and alongside or coextending with the main branch 336 via a first connecting trace 340, and a second parallel branch 342 coupled to and alongside or coextending with the first parallel branch 338 via a second connecting trace 344. As with the main branch 336, varying dimensions of the first parallel branch 338 and/or the second parallel branch 342 may affect out-of-band loss and in-band rejection. In particular, increasing the length of the first parallel branch 338 and/or the second parallel branch 342 (e.g., along the x-axis 106) may increase the out-of-band loss, while increasing the in-band rejection, as discussed in further detail below. As illustrated, the first connecting trace 340 may couple to the main branch 336 at the first terminal 332, and may be approximately orthogonal (e.g., 90°) to or intersect the main branch 336, though, in additional or alternative embodiments, the first connecting trace 340 may couple the main branch 336 to the first parallel branch 338 at any suitable angle. Similarly, the second connecting trace 344 may couple to the first parallel branch 338 to the second parallel branch 342 at an approximately orthogonal angle (e.g., 90°), though, in additional or alternative embodiments, the second connecting trace 344 may couple the first parallel branch 338 to the second parallel branch 342 at any suitable angle. As illustrated, the second parallel branch 342 is coupled to an electrical ground 346, providing a low impedance pathway for higher frequency signals (e.g., between 36.4 and 41.2 GHz), thus acting as a shunt.

In some embodiments, the first connecting trace 340 and/or the second connecting trace 344 may have similar dimensions as the first and/or second connecting trace 114, 118 of the filter 100 of FIG. 5. In particular, the first connecting trace 340 and the second connecting trace 344 may, together, have a total length (e.g., along the x-axis 106) of less than 6 mm (e.g., approximately 4 m), though any suitable total length is contemplated (e.g., 6 mm or greater, 10 mm or greater, 12 mm or greater, and so on). Moreover, the first connecting trace 340 may be greater in length (e.g., along the x-axis 106) than the second connecting trace 344, though, in additional or alternative embodiments, their lengths may be approximately equal, or the length of the second connecting trace 344 may be greater than the length of the first connecting trace 340. For example, the length of the first connecting trace 340 may be approximately 2.5 mm, and the length of the second connecting trace 344 may be approximately 1.5 mm.

As further illustrated, the first parallel branch 338 and/or the second parallel branch 342 may have similar dimensions as the first and/or second parallel branches 112, 117 of the filter 100 of FIG. 5. In particular, the first parallel branch 338 and the second parallel branch 342 may each have a length (e.g., along the x-axis 106) of less than 1.1 mm, though any suitable total length is contemplated (e.g., 1 mm or greater, 2 mm or greater, 5 mm or greater, 10 mm or greater, and so on). Moreover, the first parallel branch 338 may be shorter in length (e.g., along the x-axis 106) than the second parallel branch 342, though, in additional or alternative embodiments, their lengths may be approximately equal, or the length of the second parallel branch 342 may be less than the length of the first parallel branch 338. For example, the length of the first parallel branch 338 may be approximately 0.8 mm, and the length of the second parallel branch 342 may be approximately 1 mm. Additionally, the filter 330 may fit within a width 347 (e.g., along the y-axis 108) of 0.6 mm, though any suitable width is contemplated (e.g., 0.1 mm or greater, 0.3 mm or greater, 1 mm or greater, 5 mm or greater, and so on).

Figure 18:
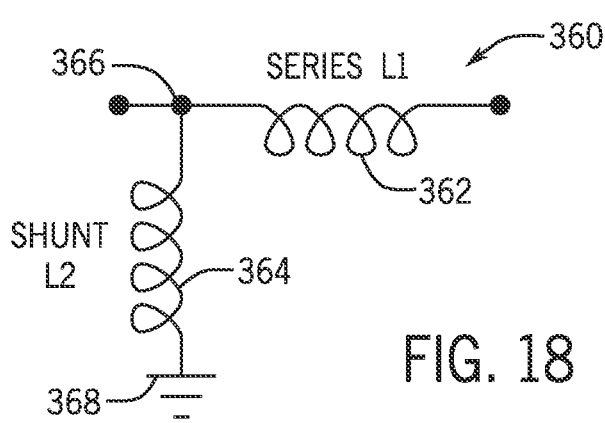
FIG. 18 is a circuit diagram of a lumped-element approximation of the filter of FIG. 17, according to embodiments of the present disclosure.

The main branch 336 and the first and second parallel branches 338, 342 may act as lumped elements to enable the filter 330 to reject power of a wireless signal having an undesired frequency while causing a decreased power loss to a wireless signal having a desired frequency. FIG. 18 is a circuit diagram of a lumped-element approximation of the filter 330, according to embodiments of the present disclosure. The illustrated circuit 360 approximates the main branch 336 as a series inductor 362 providing a series inductance L1 and the first and second parallel branches 338, 342 as a shunt inductor 364 providing a shunt inductance L2 coupled to a first end or node 366 of the series inductor 362. The shunt inductor 364 is coupled to an electrical ground 368, providing a low impedance pathway for higher frequency signals (e.g., between 36.4 and 41.2 GHz), thus acting as a shunt.

Figure 19:
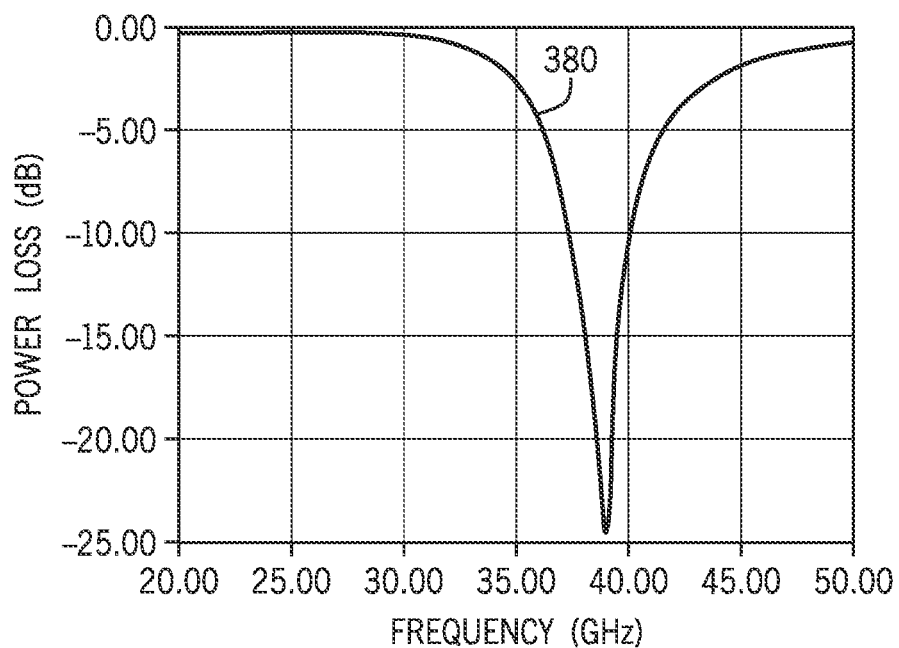
FIG. 19 is a plot showing power loss of the filter of FIG. 17 with varying frequency, according to embodiments of the present disclosure.

In particular, the filter 330 may act as a band stop filter that rejects at least 5.4 dB of power of a wireless signal having a frequency between 36.4 and 41.2 gigahertz, while causing a power loss of at most 0.34 dB to a wireless signal having a frequency lower than 29.5 GHz. FIG. 19 is a plot showing power loss 380 of the filter 330 with varying frequency, according to embodiments of the present disclosure. As illustrated, for frequencies lower than 29.5 GHz, the filter 330 causes a power loss 380 (e.g., an out-of-band loss) of at most 0.34 dB. For example, at 26.5 GHz, the filter 330 causes a power loss 380 of 0.19 dB, and at 29.5 GHz, the filter 330 causes a power loss of 0.33 dB. At frequencies of between 36.4 and 41.2 GHz, the filter 330 causes a power loss 380 (e.g., an in-band rejection) of greater than 5.4 dB. For example, at 36.4 GHz, the filter 330 causes a power loss 380 of 5.9 dB, and at 41.3 GHz, the filter 330 causes a power loss 380 of 5.4 dB. The performance shown in the plot may be particularly suited for mmWave operation that may occur over a frequency range at less than or equal to 29.5 GHz and experience noise at 31 GHz or greater (e.g., at 32.3 GHz as may be caused by satellite and/or space communication). Because the filter 330 is made of distributed elements rather than lumped elements, the filter 330 may be disposed on an intermediate or deeper layer of a printed circuit board, such as the layer 202C of the PCB 200 shown in FIG. 12, which may decrease path loss in wireless signals sent and/or received from the electronic device 10, as discussed with respect to FIG. 12 above.

Figure 20:
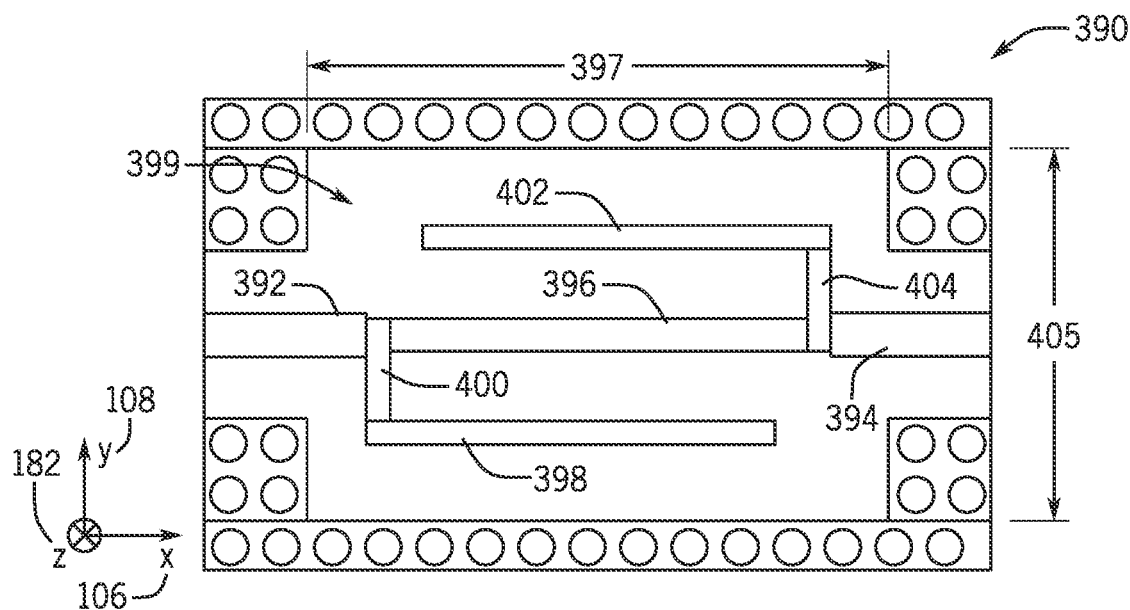
FIG. 20 is a diagram of a band stop filter with open shunt elements, according to embodiments of the present disclosure.

FIG. 20 is a diagram of a band stop filter 390 with open shunt elements, according to embodiments of the present disclosure. As with the filter 100 of FIG. 5, the band stop filter 390 may include a distributed-element filter rather than a lumped-element filter. The filter 390 may include a first terminal 392 (e.g., an input terminal) and a second terminal 394 (e.g., an output terminal). While the first terminal 392 may couple to an electrical current source and the second terminal 394 may provide an output current, in alternative embodiments, this may be reversed.

The filter 390 may also include a main (e.g., series) branch trace 396 coupling the first terminal 392 to the second terminal 394. Varying dimensions of the main branch 396 may affect loss of a power of a signal passing through the filter 390 of a desired frequency (e.g., out-of-band loss) and rejection of a power of a signal to vary passing through the filter 390 of an undesired frequency (e.g., in-band rejection). In particular, increasing the length (e.g., along the x-axis 106) of the main branch 396 may increase the out-of-band loss, while increasing the in-band rejection, as discussed in further detail below. As illustrated, the main branch 396 may be less than 1.1 mm long (e.g., along the x-axis 106), such as 1 mm, and approximately 42 μm wide (e.g., along the y-axis 108), though the main branch 396 may be of any suitable dimensions that enable effective out-of-band loss and in-band rejection performance and/or coupling to other circuitry (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on), as discussed in further detail below.

As illustrated, the filter 390 includes a first parallel branch or trace 398 coupled and parallel to, alongside, or coextensive with the main branch 396 via a first connecting trace 400. As with the main branch 396, varying dimensions of the first parallel branch 398 may affect out-of-band loss and in-band rejection. In particular, increasing the length (e.g., along the x-axis 106) of the first parallel branch 398 may increase the out-of-band loss, while increasing the in-band rejection, as discussed in further detail below. As illustrated, the first connecting trace 400 may couple to the main branch 396 at the first terminal 392, and may be approximately orthogonal (e.g., 90°) to or intersect the main branch 396 and the first parallel branch 398, though, in additional or alternative embodiments, the first connecting trace 400 may couple the main branch 396 to the first parallel branch 398 at any suitable angle (e.g., greater than 0°, greater than 30°, greater than 45°, greater than 60°, less than 120°, less than 135°, less than 150°, less than 180°, and so on). As such, the first parallel branch 398 may extend in a direction (e.g., a same direction as the main branch 396) from the first terminal 392 to the second terminal 394 (along the x-axis 106). The first connecting trace 400 may be less than or equal to approximately 0.3 mm long (e.g., along the y-axis 108) and approximately 42 μm wide (e.g., along the x-axis 106), though the first connecting trace 400 may be of any suitable dimensions that enable coupling the first parallel branch 398 to the main branch 396 (e.g., greater than 0 μm long and greater than 0 μm wide, greater than 10 μm long and greater than 10 μm wide, greater than 50 μm long and greater than 20 μm wide, greater than 100 μm long and greater than 50 μm wide, and so on).

As further illustrated, the first parallel branch 398 may have a length less than that of the main branch 396 (e.g., along the x-axis 106), such as 0.7 mm, and be approximately 42 μm wide (e.g., along the y-axis 108), though the first parallel branch 398 may be of any suitable dimensions that enable effective out-of-band loss and in-band rejection performance (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on), as discussed in further detail below. That is, the first parallel branch 398 may have a length less than a distance between the first terminal 392 and the second terminal 394. Accordingly, while a first end of the first parallel branch 398 that couples to the first connecting trace 400 is aligned with the first terminal 392 (along the y-axis 108), a second end (or open stub) of the first parallel branch 398 may extend past the second terminal 394 (with respect to the y-axis 108).

Additionally, the filter 390 may include a second parallel branch or trace 402 coupled and parallel to, alongside, or coextensive with the main branch 396 via a second connecting trace 404. In particular, the second connecting trace 404 may extend from the main branch 396 in an opposite direction (e.g., with respect to the y-axis 108 and/or the main branch 396) than the first connecting trace 400. As with the main branch 396 and the first parallel branch 398, varying dimensions of the second parallel branch 402 may affect out-of-band loss and in-band rejection. In particular, increasing the length (e.g., along the x-axis 106) of the second parallel branch 402 may increase the in-band loss, while increasing the in-band rejection, as discussed in further detail below. As illustrated, the second connecting trace 404 may couple to the main branch 396 at the second terminal 104, and may be approximately orthogonal (e.g., 90°) to or intersect the main branch 396 and the second parallel branch 402, though, in additional or alternative embodiments, the second connecting trace 404 may couple the main branch 396 to the second parallel branch 402 at any suitable angle (e.g., greater than 0°, greater than 30°, greater than 45°, greater than 60°, less than 120°, less than 135°, less than 150°, less than 180°, and so on).

The second connecting trace 404 may have similar dimensions as the first connecting trace 400, and may extend in a direction from the second terminal 394 to the first terminal 392 (along the x-axis 106). The second parallel branch 402 may also have similar dimensions as the first parallel branch 398, and thus may have a length less than that of the main branch 396. That is, the second parallel branch 402 may have a length less than a distance between the first terminal 392 and the second terminal 394. Accordingly, while a first end of the second parallel branch 402 that couples to the second connecting trace 404 is aligned with the second terminal 394 (along the y-axis 108), a second end (or open stub) of the second parallel branch 402 may extend past the first terminal 392 (with respect to the y-axis 108). Additionally, the filter 390 may fit within a width 405 (e.g., along the y-axis 108) of 0.7 mm, though any suitable width is contemplated (e.g., 0.1 mm or greater, 0.3 mm or greater, 0.5 mm or greater, 1 mm or greater, 5 mm or greater, and so on).

The main branch 396 and the first and second parallel branches 398, 402 may act as lumped elements to enable the filter 390 to reject power of a wireless signal having an undesired frequency while causing a decreased power loss to a wireless signal having a desired frequency. In particular, the main branch 396 may act as the inductor L1 (132), the first parallel branch 398 as the first capacitor C1 (134) coupled to a first end or node 136 of the inductor 132, and the second parallel branch 402 as the second capacitor C2 (138) coupled to a second end or node 140 of the inductor 132, as shown in the circuit diagram of the lumped-element approximation of FIG. 6. Moreover, the first parallel branch 398 and the second parallel branch 402 may acts as open shunt elements, providing low impedance pathways for higher frequency signals (e.g., between 36.4 and 50 GHz).

Figure 21:
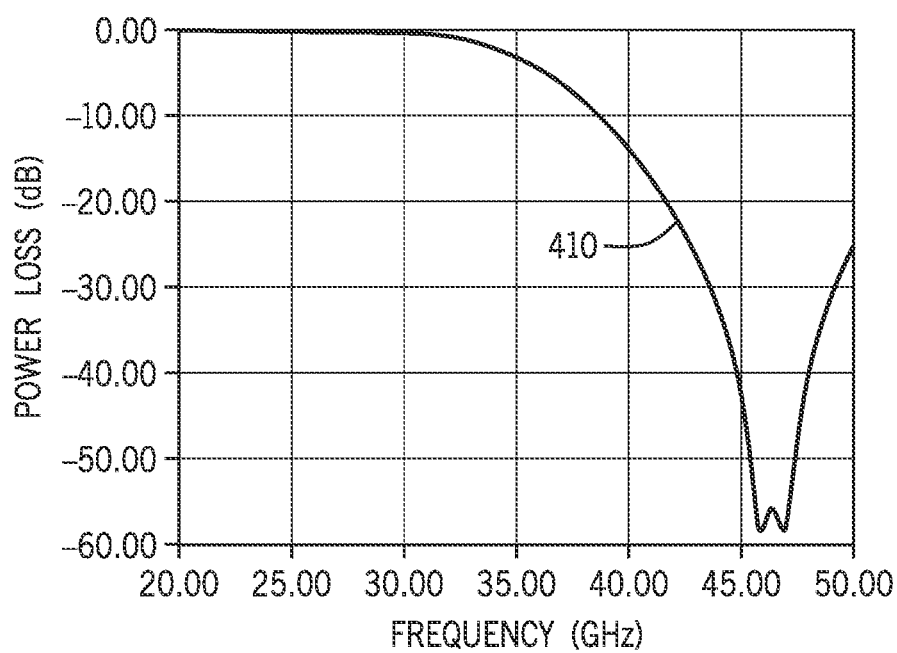
FIG. 21 is a plot showing power loss of the filter of FIG. 20 with varying frequency, according to embodiments of the present disclosure.

The filter 390 may act as a band stop filter that rejects at least 5.3 dB of power of a wireless signal having a frequency between 36.4 and 50 GHz, while causing a power loss of at most 0.28 dB to a wireless signal having a frequency lower than 29.5 GHz. FIG. 21 is a plot showing power loss 410 of the filter 390 with varying frequency, according to embodiments of the present disclosure. As illustrated, for frequencies lower than 29.5 GHz, the filter 390 causes a power loss 410 (e.g., an out-of-band loss) of at most 0.28 dB. For example, at 26.5 GHz, the filter 390 causes a power loss 410 of 0.19 dB, and at 29.5 GHz, the filter 100 causes a power loss of 0.28 dB. At frequencies between 36.4 and 50 GHz, the filter 390 causes a power loss 410 (e.g., an in-band rejection) of at least 5.3 dB. For example, at 36.4 GHz, the filter 390 causes a power loss 410 of 5.4 dB. The performance shown in the plot may be particularly suited for mmWave operation that may occur over a frequency range at less than or equal to 29.5 GHz (e.g., on the n257 band (26.5-29.5 GHz), the n258 band (24.25-27.5 GHz), the n261 band (27.5-28.35 GHz), and so on) and experience noise at 31 GHz or greater (e.g., at 32.3 GHz as may be caused by satellite and/or space communication). Because the filter 390 is made of distributed elements rather than lumped elements, the filter 390 may be disposed on an intermediate or deeper layer of a printed circuit board, such as the layer 202C of the PCB 200 shown in FIG. 12, which may decrease path loss in wireless signals sent and/or received from the electronic device 10, as discussed with respect to FIG. 12 above.

Figure 22:
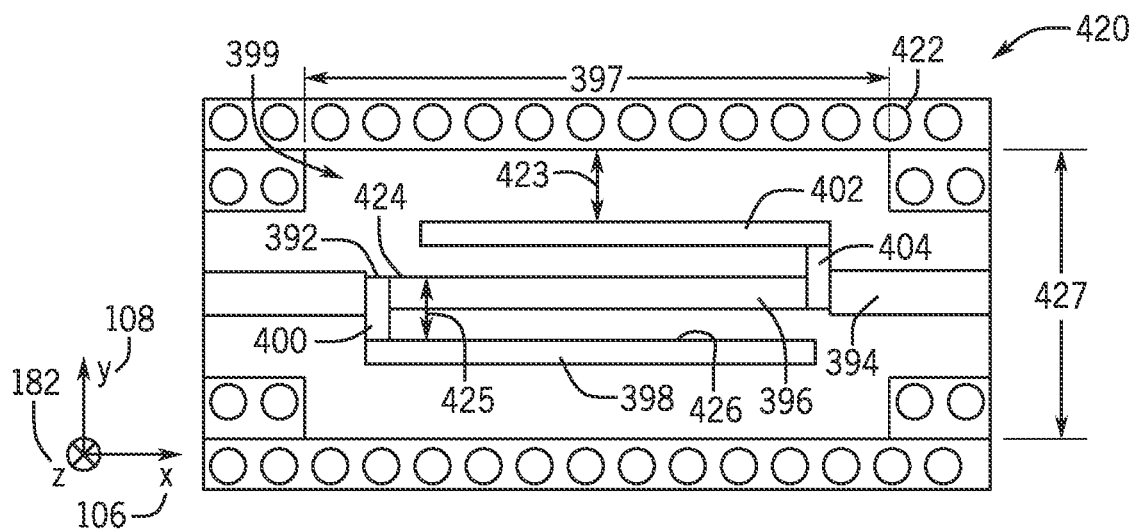
FIG. 22 is a diagram of a band stop filter with open shunt elements, according to embodiments of the present disclosure.

Other dimensional characteristics of the filters described herein may affect filtering performance. For example, a distance between the main branch 396 and each parallel branch 398, 402 may affect out-of-band loss and in-band rejection. FIG. 22 is a diagram of a band stop filter 420 with open shunt elements, according to embodiments of the present disclosure. The filter 420 may be similar, have similar components, and have similar dimensions to the band stop filter 390 of FIG. 20. Additionally, the first parallel branch 398 and the second parallel branch 402 of the filter 420 may be spaced from an electrical ground 422 (e.g., of a layer of a circuit board on which the filter 420 is disposed) by a buffer or ground gap 423 having a distance (e.g., along the y-axis 108) of approximately 0.12 mm (though any suitable distance 423 is contemplated). Moreover, while the second parallel branch 402 is shorter in length (along the x-axis 106) than the main branch 396, the first parallel branch 398 may be approximately greater to or equal in length (along the x-axis 106) to the main branch 396. That is, while a first end of the first parallel branch 398 that couples to the first connecting trace 400 is aligned with the first terminal 392 (along the y-axis 108) and a second end (or open stub) of the first parallel branch 398 is aligned with or may extend past the second terminal 394 (with respect to the y-axis 108), a first end of the second parallel branch 402 that couples to the second connecting trace 404 is aligned with the second terminal 394 (along the y-axis 108) and a second end (or open stub) of the second parallel branch 402 may not reach the first terminal 392 (with respect to the y-axis 108).

Further, a distance 425 between a distal edge 424 of the main trace 396 and a proximal edge 426 of each parallel branch 398, 402 (with respect to the y-axis 108) may be approximately 0.12 mm (though any suitable distance 425 is contemplated). In some embodiments, the main branch 396 may be less than a length 397 of an accommodating space 399 of 1.1 mm long (e.g., along the x-axis 106), such as 1 mm, and approximately 42 μm wide (e.g., along the y-axis 108), though the main branch 396 may be of any suitable dimensions that enable effective out-of-band loss and in-band rejection performance and/or coupling to other circuitry (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on), as discussed in further detail below. Additionally, the filter 420 may fit within a width 427 (e.g., along the y-axis 108) of 0.56 mm, though any suitable width is contemplated (e.g., 0.1 mm or greater, 0.3 mm or greater, 0.5 mm or greater, 1 mm or greater, 5 mm or greater, and so on).

Figure 23:
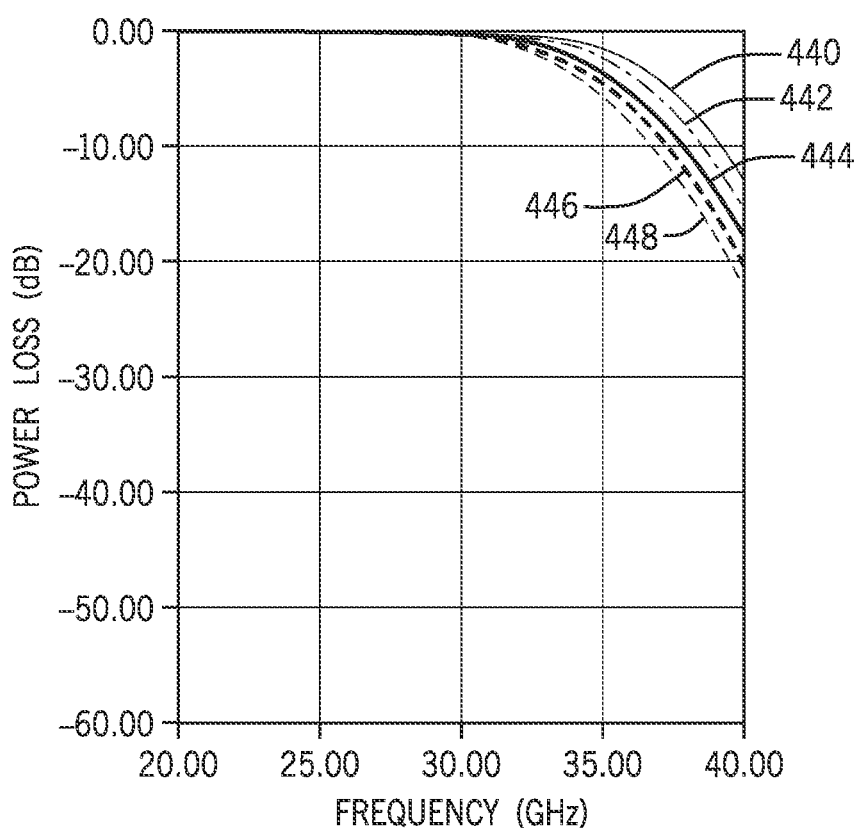
FIG. 23 is a plot showing power loss of the filter of FIG. 22 with varying frequency, according to embodiments of the present disclosure

As this distance (e.g., a distance between the main trace 396 and each parallel branch 398, 402) increases, the greater the out-of-band loss and in-band rejection. FIG. 23 is a plot showing power loss 440 of the filter 420 with varying frequency, according to embodiments of the present disclosure. In particular, the power loss 440 corresponds to the distance between the main trace 396 and each parallel branch 398, 402 being 0.12 mm. As illustrated, with the distance being 0.12 mm, the filter 420 may cause a power loss 440 (e.g., an out-of-band loss) of 0.2 dB at 26.5 GHz, a power loss (e.g., an out-of-band loss) 440 of 0.25 dB at 30 GHz, and a power loss 440 (e.g., an in-band rejection) of 3.3 dB at 36.5 GHz.

Additionally, the power loss 442, 444, 446, and 448 correspond to the distance being 0.14 mm, 0.16 mm, 0.18 mm, and 0.2 mm, respectively. Accordingly, the greater the distance between the main trace 396 and each parallel branch 398, 402, the greater the power loss (e.g., the greater the out-of-band loss and in-band rejection), and vice versa. It should be understood that this relationship may be applied to any of the filters described above, such as the filter 100 of FIG. 5, the filter 390 of FIG. 20, and so on. However, increasing the distance between the main trace 396 and each parallel branch 398, 402 may result in increasing a width of a routing channel (e.g., the routing channel 210 of FIG. 13) of a layer of a printed circuit board, which may take up more space in the electronic device 10.

Figure 24:
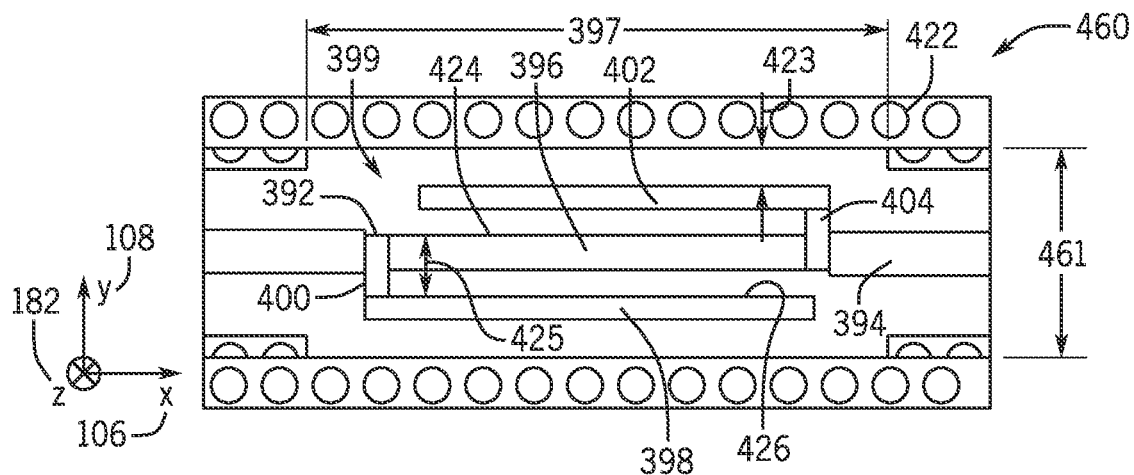
FIG. 24 is a diagram of a band stop filter with open shunt elements, according to embodiments of the present disclosure.

Another dimensional characteristic that may affect filtering performance is the ground gap between a filter and an electrical ground of a layer of a printed circuit board on which the filter is disposed (e.g., bordering a routing channel). FIG. 24 is a diagram of a band stop filter 460 with open shunt elements, according to embodiments of the present disclosure. The filter 460 may be similar, have similar components, and have similar dimensions to the band stop filter 420 of FIG. 22. Additionally, a distance 425 between the distal edge 424 of the main trace 396 and a proximal edge 426 of each parallel branch 398, 402 (with respect to the y-axis 108) may be approximately 0.12 mm (though any suitable distance 425 is contemplated). In some embodiments, the main branch 396 may be less than a length 397 of an accommodating space 399 of 1.1 mm long (e.g., along the x-axis 106), such as 1 mm, and approximately 42 μm wide (e.g., along the y-axis 108), though the main branch 396 may be of any suitable dimensions that enable effective out-of-band loss and in-band rejection performance and/or coupling to other circuitry (e.g., greater than 0 μm long and greater than 0 μm wide, greater than 10 μm long and greater than 10 μm wide, greater than 100 μm long and greater than 50 μm wide, greater than 200 μm long and greater than 100 μm wide, greater than 500 μm long and greater than 300 μm wide, and so on), as discussed in further detail below. Additionally, the filter 460 may fit within a width 461 (e.g., along the y-axis 108) of 0.41 mm, though any suitable width is contemplated (e.g., 0.1 mm or greater, 0.3 mm or greater, 0.5 mm or greater, 1 mm or greater, 5 mm or greater, and so on).

Figure 25:
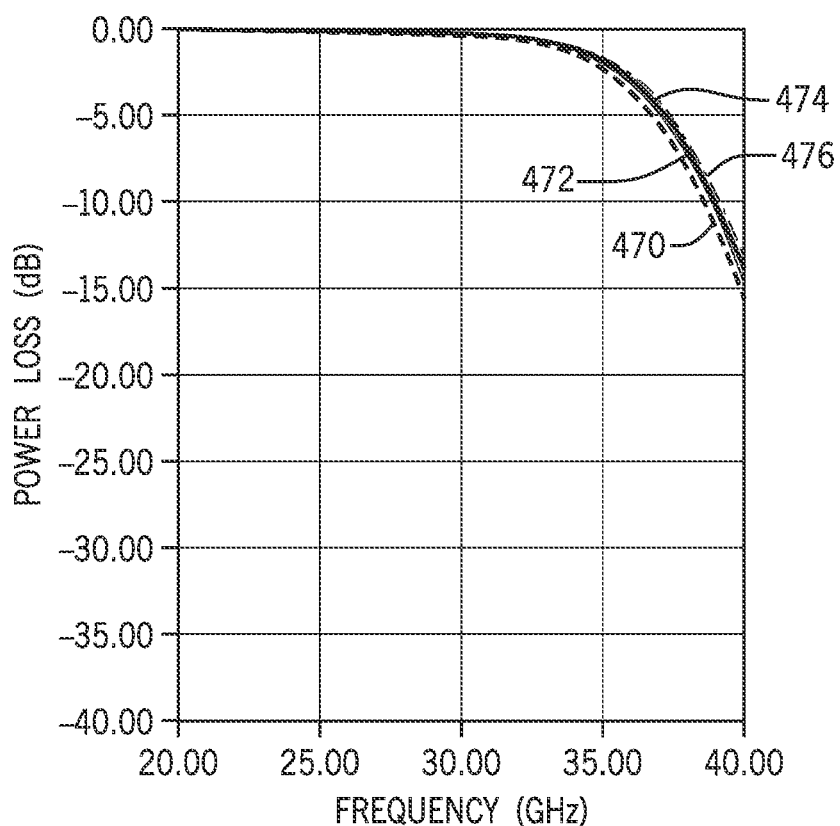
FIG. 25 is a plot showing power loss of the filter of FIG. 24 with varying frequency, according to embodiments of the present disclosure.

Moreover, as illustrated, the first parallel branch 398 and the second parallel branch 402 of the filter 460 may be spaced from the electrical ground 422 by a buffer or ground gap 423 having a distance (e.g., along the y-axis 108) of approximately 0.04 mm. As the distance of the ground gap 423 increases, the less the out-of-band loss and in-band rejection. FIG. 25 is a plot showing power loss 470 of the filter 460 with varying frequency, according to embodiments of the present disclosure. In particular, the power loss 470 corresponds to the distance of the ground gap 423 being 0.04 mm. As illustrated, with the distance of the ground gap 423 being 0.04 mm, the filter 460 may cause a power loss 470 (e.g., an out-of-band loss) of 0.22 dB at 26.5 GHz, a power loss (e.g., an out-of-band loss) 470 of 0.28 dB at 30 GHz, and a power loss 470 (e.g., an in-band rejection) of 4.3 dB at 36.5 GHz. Additionally, the power loss 472, 474, and 476 correspond to the distance of the ground gap 423 being 0.06 mm, 0.08 mm, and 0.12 mm, respectively. Accordingly, the greater the distance of the ground gap 423, the less the power loss (e.g., the less the out-of-band loss and in-band rejection), and vice versa. It should be understood that this relationship may be applied to any of the filters described above, such as the filter 100 of FIG. 5, the filter 390 of FIG. 20, and so on.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. Frequency-filtering circuitry comprising:
a main branch comprising a first terminal and a second terminal, the main branch extending in a first direction, a distance between the first terminal and the second terminal being between 700 and 900 micrometers;
a first branch coupled to the main branch at the first terminal via a first connecting trace, the first branch extending in a same direction as the main branch, and the first connecting trace intersecting the main branch and the first branch; and
a second branch coupled to the main branch at the second terminal via a second connecting trace, the second branch extending in a second direction, the second direction being different from the first direction, and the second connecting trace intersecting the main branch and the second branch.

2. The frequency-filtering circuitry of claim 1, wherein the first branch extends in the same direction as the main branch from the first terminal toward the second terminal.

3. The frequency-filtering circuitry of claim 1, wherein the second branch extends in the second direction from the second terminal toward the first terminal.

4. The frequency-filtering circuitry of claim 1, wherein the first branch and the second branch are each longer than the distance between the first terminal and the second terminal.

5. The frequency-filtering circuitry of claim 1, wherein the first branch and the second branch are each between 800 and 1100 micrometers.

6. The frequency-filtering circuitry of claim 1, wherein the frequency-filtering circuitry is configured to reject at least 5 decibels of power of a wireless signal having a frequency over 32 gigahertz.

7. The frequency-filtering circuitry of claim 1, wherein the frequency-filtering circuitry is configured to cause a power loss of at most 1.1 decibels to a wireless signal having a frequency lower than 29.5 gigahertz.

8. The frequency-filtering circuitry of claim 1, wherein a length of the second branch is greater than or equal to a length of the main branch.

9. The frequency-filtering circuitry of claim 1, wherein a length of the second branch is less than a length of the main branch.

10. The frequency-filtering circuitry of claim 1, wherein a length of the first branch is less than a length of the main branch.

11. A transceiver, comprising:
an amplifier; and
frequency-filtering circuitry coupled to the amplifier, the frequency-filtering circuitry comprising:
a main branch comprising a first terminal and a second terminal, the main branch extending in a first direction, a distance between the first terminal and the second terminal being between 700 and 900 micrometers;
a first branch coupled to the main branch at the first terminal via a first connecting trace, the first branch extending in a same direction as the main branch, and the first connecting trace intersecting the main branch and the first branch; and
a second branch coupled to the main branch at the second terminal via a second connecting trace, the second branch extending in a second direction, the second direction being different from the first direction, and the second connecting trace intersecting the main branch and the second branch.

12. The transceiver of claim 11, wherein a height of the frequency-filtering circuitry comprises 15 micrometers or less.

13. The transceiver of claim 11, wherein a width of the frequency-filtering circuitry is within 206 micrometers.

14. The transceiver of claim 11, wherein a length of the first branch is less than a length of the main branch.

15. The transceiver of claim 11, wherein a length of the second branch is less than the length of the main branch.

16. The transceiver of claim 11, wherein a length of the second branch is greater than or equal to the length of the main branch.

17. An electronic device, comprising:
one or more antennas; and
a transceiver electrically coupled to the one or more antennas, the transceiver comprising:
a main branch comprising a first terminal and a second terminal, the main branch extending in a first direction, a distance between the first terminal and the second terminal being between 700 and 900 micrometers;
a first branch coupled to the main branch at the first terminal via a first connecting trace, the first branch extending in a same direction as the main branch, and the first connecting trace intersecting the main branch and the first branch; and a second branch coupled to the main branch at the second terminal via a second connecting trace, the second branch extending in a second direction, the second direction being different from the first direction, and the second connecting trace intersecting the main branch and the second branch.

18. The electronic device of claim 17, further comprising a printed circuit board having at least a first layer, a second layer, and an intermediate layer disposed between the first layer and the second layer, wherein the main branch, the first branch, and the second branch are disposed on the intermediate layer.

19. The electronic device of claim 18, wherein the intermediate layer comprises a routing channel in which the main branch, the first branch, and the second branch are disposed.

20. The electronic device of claim 17, wherein the main branch is configured to provide a series inductance, the first branch is configured to provide a first inductance, and the second branch is configured to provide a second inductance.

\* \* \* \* \*